United States Patent
Nanda et al.

(10) Patent No.: US 9,661,649 B2
(45) Date of Patent: *May 23, 2017

(54) DETERMINING A TRANSMIT PARAMETER FOR WIRELESS COMMUNICATION

(71) Applicant: QUALCOMM Incorporated, San Diego, CA (US)

(72) Inventors: Sanjiv Nanda, San Diego, CA (US); Ashwin Sampath, Skillman, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 14/679,931

(22) Filed: Apr. 6, 2015

(65) Prior Publication Data

US 2015/0215959 A1    Jul. 30, 2015

Related U.S. Application Data

(63) Continuation of application No. 11/833,925, filed on Aug. 3, 2007, now Pat. No. 9,008,002.

(Continued)

(51) Int. Cl.
*H04W 72/12* (2009.01)
*H04W 72/02* (2009.01)
*H04W 72/08* (2009.01)

(52) U.S. Cl.
CPC ....... *H04W 72/1231* (2013.01); *H04W 72/02* (2013.01); *H04W 72/082* (2013.01)

(58) Field of Classification Search
None
See application file for complete search history.

(56) References Cited

U.S. PATENT DOCUMENTS 6,879,806 B2  4/2005 Shorty
6,970,445 B2  11/2005 O'Neill et al.
(Continued)

FOREIGN PATENT DOCUMENTS

CN    1250280 A    4/2000
EP    0980153 A2   2/2000
(Continued)

OTHER PUBLICATIONS

International Search Report—PCT/US07/075260, International Search Authority, European Patent Office—Jan. 21, 2008.
(Continued)

*Primary Examiner* — Chi H Pham
*Assistant Examiner* — Soon-Dong D Hyun
(74) *Attorney, Agent, or Firm* — Joseph Hanasz

(57) ABSTRACT

A wireless media access control supports asynchronous communication and overlapping transmissions. Here, a wireless node may determine whether to request or schedule a transmission based on control messages it receives from neighboring nodes. In some implementations a scheduled transmission may be divided up into several segments so that a transmitting node may receive and transmit control messages between segments. In some implementations a monitoring period is defined after a scheduled transmission period to enable the transmitting node to acquire control information that may otherwise have been transmitted during the scheduled transmission period. In some implementations data and control information are transmitted over different frequency division multiplexed channels to enable concurrent transmission of the data and control information.

30 Claims, 20 Drawing Sheets

Related U.S. Application Data

(60) Provisional application No. 60/836,179, filed on Aug. 7, 2006.

(56) References Cited

U.S. PATENT DOCUMENTS

| | | |
|---|---|---|
| 7,373,112 B2 | 5/2008 | Stephens et al. |
| 7,561,542 B2 | 7/2009 | Alapuranen et al. |
| 7,697,893 B2 | 4/2010 | Kossi et al. |
| 8,310,996 B2 | 11/2012 | Nanda et al. |
| 8,340,027 B2 | 12/2012 | Nanda et al. |
| 8,416,762 B2 | 4/2013 | Nanda et al. |
| 8,737,313 B2 | 5/2014 | Nanda et al. |
| 2002/0071413 A1 | 6/2002 | Choi |
| 2003/0039269 A1 | 2/2003 | Ala-Vannesluoma |
| 2003/0067873 A1 | 4/2003 | Fuhrmann et al. |
| 2003/0099221 A1 | 5/2003 | Rhee |
| 2004/0013135 A1 | 1/2004 | Haddad |
| 2004/0141512 A1 | 7/2004 | Komagata et al. |
| 2004/0258039 A1 | 12/2004 | Stephens |
| 2004/0264507 A1 | 12/2004 | Cho et al. |
| 2005/0220068 A1 | 10/2005 | Kim et al. |
| 2005/0243782 A1 | 11/2005 | Sakoda et al. |
| 2006/0056382 A1 | 3/2006 | Yamada et al. |
| 2006/0062146 A1 | 3/2006 | Sebire et al. |
| 2006/0246907 A1 | 11/2006 | Kaikkonen et al. |
| 2006/0291389 A1 | 12/2006 | Attar et al. |
| 2007/0258540 A1 | 11/2007 | Ratasuk et al. |
| 2007/0263529 A1 | 11/2007 | Ishikura et al. |
| 2008/0031222 A1 | 2/2008 | Nanda et al. |
| 2008/0056198 A1 | 3/2008 | Charpentier et al. |
| 2008/0095123 A1 | 4/2008 | Kuroda et al. |
| 2008/0123682 A1 | 5/2008 | Yackoski et al. |
| 2008/0144493 A1 | 6/2008 | Yeh |
| 2008/0187064 A1 | 8/2008 | Miyoshi |
| 2008/0253394 A1 | 10/2008 | Spinar et al. |
| 2008/0285507 A1 | 11/2008 | Mukherjee et al. |
| 2008/0318607 A1 | 12/2008 | Torsner et al. |
| 2009/0022136 A1 | 1/2009 | Joshi et al. |
| 2009/0061920 A1 | 3/2009 | Horiuchi et al. |
| 2009/0073946 A1 | 3/2009 | Morita |
| 2009/0122768 A1 | 5/2009 | Nakashima et al. |
| 2009/0180563 A1 | 7/2009 | Schmidl et al. |
| 2009/0296667 A1 | 12/2009 | Tajima et al. |
| 2009/0296833 A1 | 12/2009 | Sawahashi |
| 2010/0067505 A1 | 3/2010 | Fein et al. |

FOREIGN PATENT DOCUMENTS

| | | |
|---|---|---|
| JP | 2002507871 A | 3/2002 |
| JP | 2004533158 A | 10/2004 |
| JP | 2005236435 A | 9/2005 |
| JP | 2005340943 A | 12/2005 |
| JP | 2006101477 A | 4/2006 |
| JP | 2008500753 A | 1/2008 |
| JP | 2009523932 A | 6/2009 |
| TW | 345793 | 11/1998 |
| TW | 361024 | 6/1999 |
| TW | 412897 | 11/2000 |
| TW | 1245512 | 12/2005 |
| TW | 1256208 | 6/2006 |
| TW | 200705914 | 2/2007 |
| WO | 9948317 A2 | 9/1999 |
| WO | 02082751 A2 | 10/2002 |
| WO | 02103951 A2 | 12/2002 |
| WO | 2005039105 A1 | 4/2005 |
| WO | 2005107292 A1 | 11/2005 |
| WO | 2005117361 A1 | 12/2005 |
| WO | 2008021787 A1 | 2/2008 |

OTHER PUBLICATIONS

Taiwan Search Report—TW096129045—TIPO—Mar. 2, 2011.
Written Opinion—PCT/US2007/075260, International Search Authority, European Patent Office, Jan. 21, 2008.

DETERMINING A TRANSMIT PARAMETER FOR WIRELESS COMMUNICATION

CLAIM OF PRIORITY

This application is a continuation of U.S. patent application Ser. No. 11/833,925, filed Aug. 3, 2007, and claims the benefit of and priority to U.S. Provisional Patent Application No. 60/836,179, filed Aug. 7, 2006, the entirety of each of which is hereby incorporated by reference herein.

CROSS-REFERENCE TO RELATED APPLICATION

This application is related to U.S. patent application Ser. No. 11/833,920, filed Aug. 3, 2007, now U.S. Pat. No. 8,737,313; U.S. patent application Ser. No. 11/833,927, filed Aug. 3, 2007, now U.S. Pat. No. 8,310,996; U.S. patent application Ser. No. 11/833,935, filed Aug. 3, 2007, now U.S. Pat. No. 8,340,027; and U.S. patent application Ser. No. 11/833,940, filed Aug. 3, 2007, now U.S. Pat. No. 8,416,762; the disclosure of each of which is hereby incorporated by reference herein.

BACKGROUND

Field

This application relates generally to wireless communication, and more specifically but not exclusively to media access control for an asynchronous wireless system.

Background

Various network topologies may be employed to establish wireless communication. For example, a wide area network, a local area network, or some other type of network may be deployed depending on the particular wireless communication capabilities that are needed for a given application.

A wireless wide area network is typically a planned deployment within a licensed frequency band. Such a network may be designed to optimize spectral efficiency and quality of service to support a large number of users. A cellular network is one example of a wireless wide area network.

A wireless local area network is often deployed without centralized planning. For example, such a network may be deployed in an ad hoc manner in unlicensed spectrum. Consequently, this type of network may be used to support a single user or a small number of users. A Wi-Fi network (i.e., an IEEE 802.11-based network) is one example of a wireless local area network.

In practice, each of the above networks has various disadvantages due to tradeoffs that may be made to provide a given type of service. For example, due to the complexity of centralized planning, setting up a wireless wide area network may be relatively expensive and time consuming Hence, such a scheme may not be well suited for "hot spot" deployments. On the other hand, an adhoc network such as Wi-Fi may not achieve the same level of spatial efficiency (bits/unit area) as a planned network. Moreover, to compensate for potential interference between nodes in the network, a Wi-Fi network may employ interference mitigation techniques such as carrier sense multiple access. Such interference mitigation techniques may, however, lead to poor utilization and provide limited fairness control, and may be susceptible to hidden and exposed nodes.

SUMMARY

A summary of sample aspects of the disclosure follows. It should be understood that any reference to aspects herein may refer to one or more aspects of the disclosure.

The disclosure relates in some aspects to wireless media access control that supports asynchronous communication. Here, different sets of nodes (e.g., a transmitting node and a receiving node that are associated to communicate with one another) may communicate in an asynchronous manner with respect to other sets of nodes. Thus, the timing and duration of a transmission for a given set of nodes may be defined independently of the timing and duration of a transmission for a different set of nodes.

The disclosure also relates in some aspects to wireless media access control that supports overlapping wireless transmissions. Here, a set of nodes may schedule a transmission based on consideration of a current or future transmission by one or more neighboring nodes. This consideration may involve, for example, defining appropriate transmission parameters such as transmission rate, code rate, and transmission time to ensure that the transmission will not unduly interfere with other nodes and will be reliably received at the associated receiving node.

In some aspects a node analyzes control messages transmitted by another node to determine whether to request or schedule a transmission. For example, a first node may transmit a control message (e.g., a grant or confirmation) that indicates the time of a scheduled transmission as well as the relative transmission power of the first node. A second node that receives this control message may thereby determine, based on the power level of the received message and the rate and duration of the scheduled transmission, whether and to what extent transmission by the second node would affect or reception at the second node would be affected by the scheduled transmission of the first node. For example, a transmitting node may determine whether to initiate a request to transmit to a receiving node based on whether the desired transmission will interfere with reception at a node that is near the transmitting node. Similarly, a receiving node may determine whether to issue a grant message to schedule the requested transmission based on whether the transmission in question may be reliably received in view of any scheduled transmissions by one or more nodes that are near the receiving node.

In some aspects a scheduled transmission may be divided up into several segments where a time period is defined between each segment for the reception and transmission of control messages. In the event the condition of the transmission channel or interference condition has changed in some way, the transmitting node may thus receive control information indicative of this so that the transmitting node may adapt one or more transmission parameters for the subsequent segments. In addition, in the event there is no need to transmit data during one or more previously scheduled segments, the transmitting node may receive control information indicating that the current transmission opportunity may end. Also at this time, the transmitting node may transmit control information to neighboring nodes to keep them informed as to whether there will be any subsequent segments and, if so, the transmission parameters to be used for the subsequent segments.

In some aspects a monitoring period is defined after a scheduled transmission period to enable the transmitting node to acquire control information that may otherwise have been transmitted during the scheduled transmission period. For example, a neighboring node may delay transmission of a control message until after the end of the scheduled transmission period to ensure that the transmitting node receives the message. This stems from the fact that a node that is transmitting data on the data channel may not be capable of simultaneously receiving data either on the data or control channel, in a Time Division Duplex ("TDD") system. Alternatively, a neighboring node may transmit a control message after the end of the scheduled transmission period whereby the control message including information that was previously transmitted during the scheduled transmission period.

In some aspects data and control information are transmitted over different frequency division multiplexed ("FDM") channels to enable concurrent transmission of the data and control information. In some implementations the data and control channels are associated with a contiguous frequency band whereby portions of the control channel are interspersed between portions of the data channel within the common frequency band. In this way, frequency diversity and rate prediction of the system may be improved.

BRIEF DESCRIPTION OF THE DRAWINGS

Sample features, aspects and advantages of the disclosure will be described in the detailed description and appended claims that follow, and in the accompanying drawings, wherein:

FIG. 7, including

FIG. 8, including

FIG. 9, including

FIG. 13, including

Figure 1:
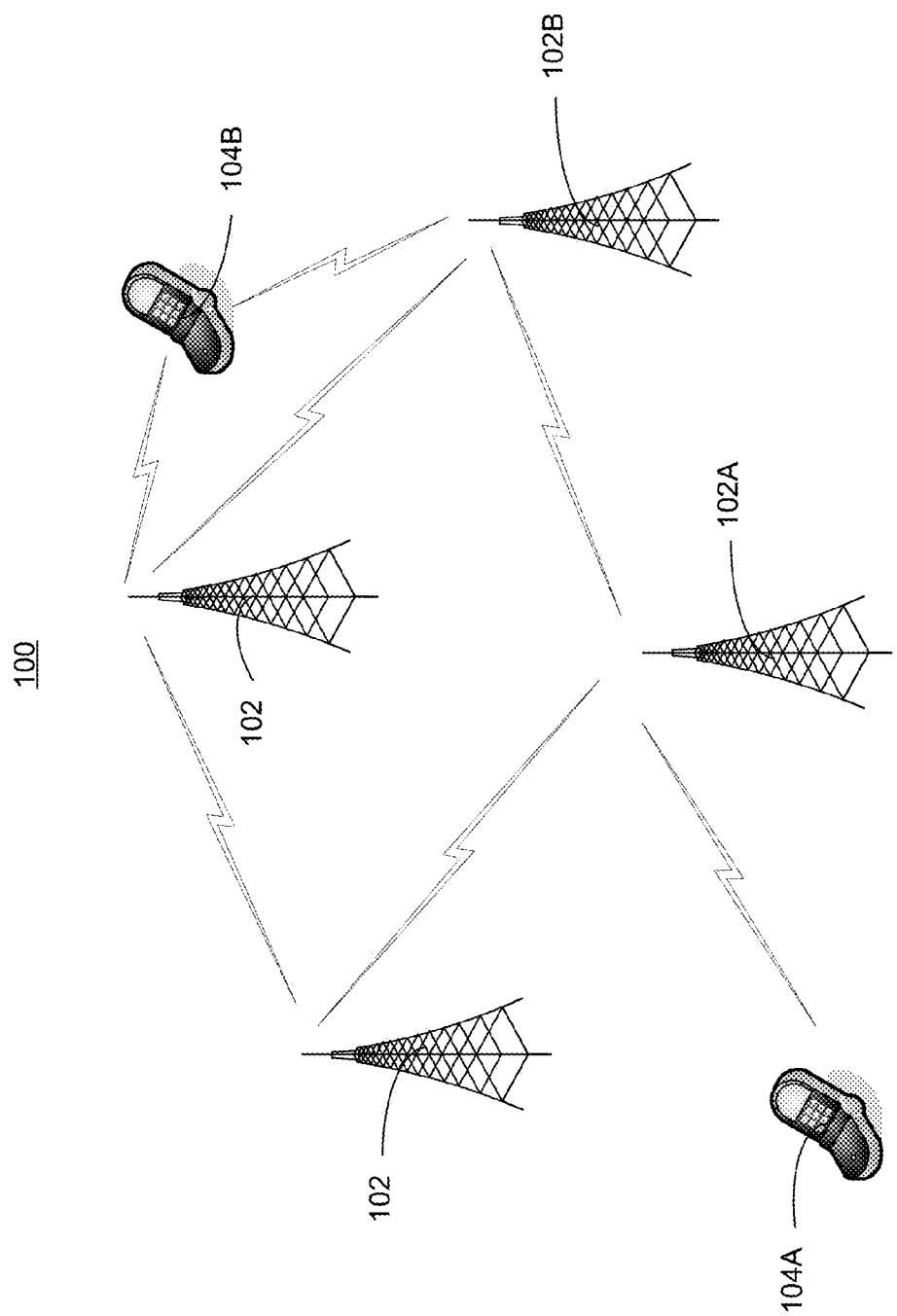
FIG. 1 is a simplified block diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, in some aspects a transmitting node determines whether to issue a request to transmit based on information the node has received regarding scheduled receptions of neighboring nodes. In addition, in some aspects a receiving node determines whether to schedule a transmission based on information that node has received regarding scheduled transmissions of its neighboring nodes.

FIG. 1 illustrates several sample aspects of a wireless communication system 100. The system 100 includes several wireless nodes, generally designated as nodes 102 and 104. A given node may receive one or more traffic flows, transmit one or more traffic flows, or both. For example, each node may comprise at least one antenna and associated receiver and transmitter components. In the discussion that follows the term receiving node may be used to refer to a node that is receiving and the term transmitting node may be used to refer to a node that is transmitting. Such a reference does not imply that the node is incapable of performing both transmit and receive operations.

In some implementations a node may comprise an access terminal, a relay point, or an access point. For example, the nodes 102 may comprise access points or relay points and the nodes 104 may comprise access terminals. In a typical implementation the access points 102 provide connectivity for a network (e.g., a Wi-Fi network, a cellular network, a WiMax network, a wide area network such as the Internet, and so on). A relay point 102 may provide connectivity to another relay point or to an access point. For example, when an access terminal (e.g., access terminal 104A) is within a coverage area of a relay point (e.g., relay point 102A) or an access point (e.g., access point 102B), the access terminal 104A may be able to communicate with another device connected to the system 100 or some other network.

In some aspects different sets of nodes in the system 100 may communicate in an asynchronous manner with respect to other sets of nodes. For example, each set of associated nodes (e.g., a set including nodes 104A and 104B) may independently select when and for how long one of the nodes in the set will transmit data to the other node in the set. In such a system, various techniques may be deployed to reduce interference between nodes and ensure that access to the communication medium is provided to all of the nodes in a fair manner, while utilizing the available bandwidth of the communication medium to the greatest practical extent.

Figure 2:
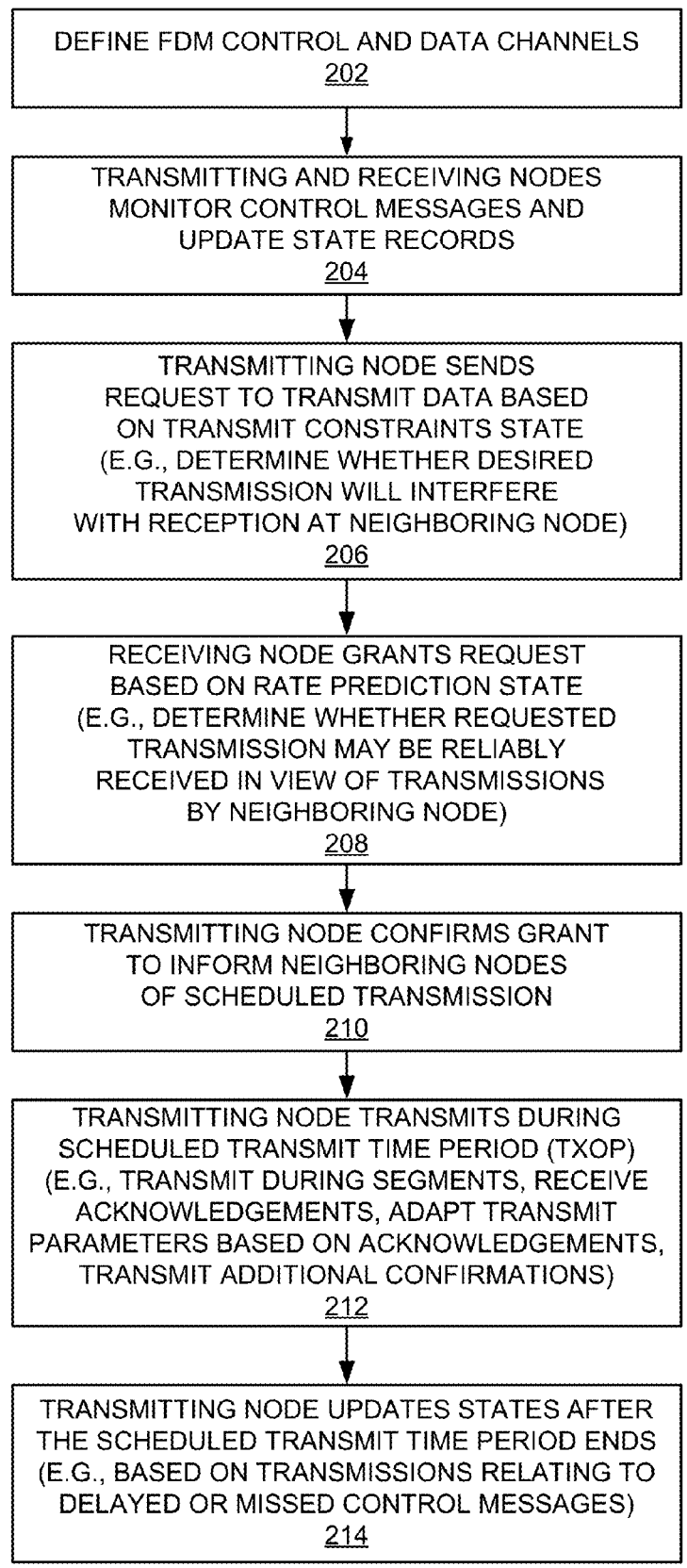
FIG. 2 is a flowchart of several sample aspects of communication operations that may be performed by nodes in an asynchronous wireless system.

The discussion that follows describes various media access control and related techniques that may be employed to, for example, reduce interference, facilitate fair sharing of resources, and achieve relatively high spectral efficiency. Referring initially to FIG. 2, this figure sets forth an overview of operations that may be performed by wireless nodes to determine whether and how to transmit at the same time and on the same channel as neighboring wireless nodes.

In some aspects wireless nodes may communicate through the use of separate control and data channels. In addition, in some implementations the control channel may be used to transmit relatively short control messages. In this way, the control channel may be lightly utilized which, in turn, may reduce delays on the control channel and reduce collisions on that channel if it supports random access.

As represented by block 202, in some aspects wireless nodes may communicate via frequency division multiplexed control and data channels. Through the use of frequency separated channels, different sets of wireless nodes may simultaneously transmit and receive data and control information thereby improving the utilization of the data channel. For example, at the same time the data channel is being used to transmit data from a first wireless node to a second wireless node, other wireless nodes that are not involved in this data exchange may exchange control information on the control channel to setup the data channel either in an overlapping manner with the current data exchange or at the completion of it. Thus, the other wireless nodes do not need to wait until the end of the current data transmission to contend for the data channel.

Figure 3:
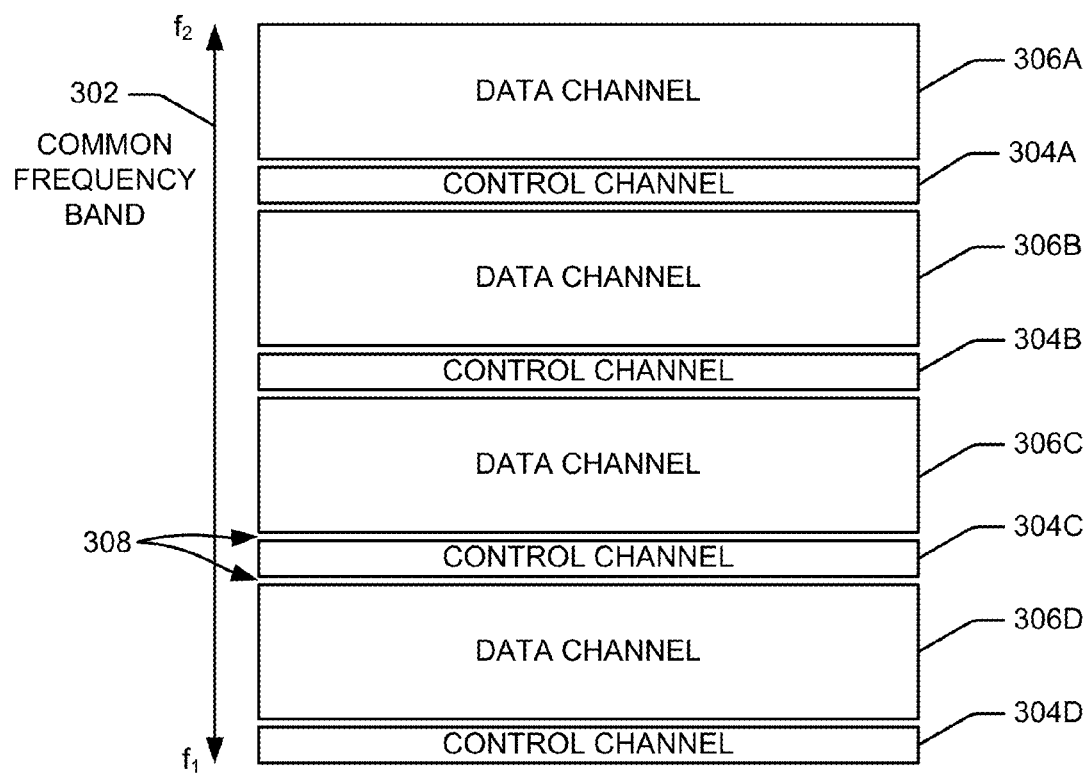
FIG. 3 is a simplified diagram of several sample aspects of frequency division multiplexed channels.

FIG. 3 illustrates in a simplified manner an example of how a data channel and a control channel may be frequency division multiplexed. In this example a control channel 304 as represented by sub-channels 304A-304D and a data channel as represented by sub-channels 306A-306D are contiguously defined within a common frequency band 302. Here, the frequency band 302 is defined as a range of frequencies from a lower frequency of $f_1$ to a higher frequency of $f_2$. It should be appreciated, however, that the common frequency band 302 may be defined in some other manner (e.g., substantially contiguous or not contiguous).

In FIG. 3 the control channel 304 is tone-interleaved with the data channel 306. In other words, the control channel is associated with a plurality of sub-frequency bands that are interspersed within the common frequency band 302. The use of such a tone-interleaved control channel may provide frequency diversity and improved rate prediction. For example, in accordance with some aspects of the disclosure control channel RSSI measurements may be used for signal and interference estimation and to predict appropriate rates for transmission over the data channel. Consequently, by interspersing portions of the control channel throughout the data channel these measurements may more accurately reflect the conditions throughout the data channel. Given that more accurate interference estimation may be made in this way, the system may be able to better select an acceptable transmission and coding rate for any data transmissions that are subject to this interference.

It should be appreciated that one or more control channels and one or more data channels may be defined in the above manner. For example, the sub-channels 304A-304D may represent a single control channel or multiple control channels. Similarly, the sub-channels 306A-306D may represent a single data channel or multiple data channels.

FIG. 3 also illustrates that in some implementations frequency guard bands 308 may be defined between adjacent control and data sub-channels. In other words, subsets of the frequency band 302 between the sub-channels may be assigned to neither the data channel nor the control channel. In this way, interference between adjacent data and control sub-channels may be reduced to some extent to alleviate, for example, near-far problems.

It should be appreciated that the above describes but one example of how wireless nodes may communicate. Thus, in other implementations data and control information may be transmitted on a common channel or in some other manner. For example, the data and control channel may be time division multiplexed rather than frequency division multiplexed.

In addition, other forms of multiplexing may be employed for the control channel. For example if there are several OFDM symbols in time, the control channel could frequency hop from symbol to symbol to effectively achieve the same effect as the example of FIG. 3. This scheme may be employed as an alternative to utilizing only a few select frequencies over all OFDM symbols (e.g., the four bands depicted in FIG. 3).

Referring again to FIG. 2, as represented by block 204 nodes may monitor a communication medium for control information from one or more other nodes to support interference management and fairness. Here, it may be assumed that any transmitting node that does not receive a control message from another node (e.g., due to the distance between the nodes) will not interfere with the node that sent the control message. Conversely, any node that does receive a control message is expected to take appropriate measures to ensure that it does not interfere with the node that sent the control message.

For example, each node in the system may transmit control information that provides certain details regarding its scheduled (e.g., current or upcoming) transmissions. Any nearby nodes that receive this control information may thus analyze the information to determine whether they may overlap their data transmission, either fully or partially, with the scheduled transmission(s) without unduly interfering with the scheduled transmissions. Fairness may be achieved through the use of resource utilization messages that indicate whether a given receiving node is not receiving data at an expected level of quality of service. Here, any transmitting node that receives the resource utilization messages may limit its transmission to improve the reception at the disadvantaged receiving node.

Figure 4:
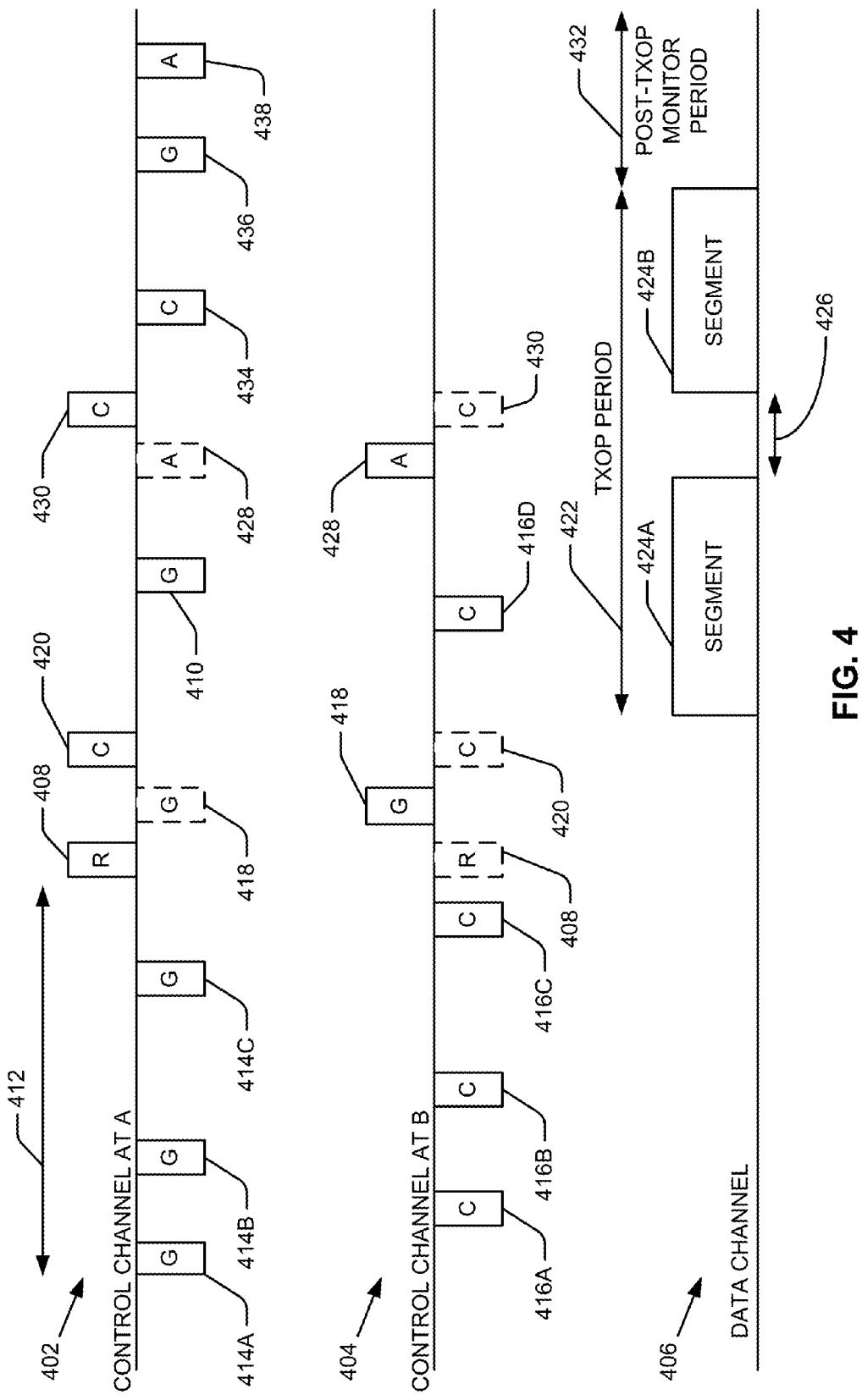
FIG. 4 is a simplified timing diagram of several sample aspects of a message exchange scheme.

FIG. 4 is a simplified timing diagram that illustrates an example of receipt and transmission of information (e.g., messages) at a pair of associated wireless nodes A and B. The upper waveform 402 represents control channel information transmitted and received by node A. The middle waveform 404 represents control channel information transmitted and received by node B. The lower waveform 406 represents transmission of data from node A to node B via a data channel. For the respective control channels, transmission of information is represented by a block above the horizontal line (e.g., block 408) while reception of information is represented by a block below the horizontal line (e.g., block 410). In addition, the dashed boxes represent the corresponding reception at one node of information transmitted by the other node.

In some implementations, a pair of associated nodes may employ a request-grant-confirmation scheme to manage interference and maximize system resource reuse. Briefly, a node (i.e., a transmitting node) that wishes to send data to another node (i.e., a receiving node) initiates the exchange by transmitting a request to transmit. An associated receiving node may then schedule the transmission by granting the request, whereby the grant may also define when and how the transmission will take place. The transmitting node acknowledges receipt of the grant by transmitting a confirmation.

In some implementations, the grant and confirmation may include information that describes one or more parameters of the scheduled transmission. For example, this information may indicate when the transmission will occur, transmission power to be used for the transmission, and other parameters that will be discussed below. A node may thereby monitor the control channel to regularly acquire this information from its neighboring node and use the acquired information to determine whether or how to schedule its own transmissions (corresponding to receptions for a receiving node).

FIG. 4 illustrates an example where node A has observed a series of grants from nodes in its vicinity over a period of time and where node B has observed a series of confirmations from nodes in its vicinity over a period of time as represented by the line 412. Note that these observed grants (414 A-C) and confirmations (416 A-C) on the control channel are unrelated to any transmissions or receptions by either Node A or Node B. Here the grants are represented by grant blocks ("G") 414A-414C and the confirmations are represented by confirmation blocks ("C") 416A-416C. It should be appreciated that the nodes may receive other types of control messages during time period 412. However, the receipt of grants by a transmitting node (e.g., node A) and the receipt of confirmations (e.g., node B) by receiving node are the primary focus of the discussion that immediately follows regarding the operation of block 204.

In some aspects, node A generates a transmit constraints state based on the received grants. For example, the transmit constraints state may comprise records of the information provided by each of the grants. In this way, node A will have information relating to the transmissions that have been scheduled by any receiving nodes that are close to node A. Thus, the transmit constraints state provides a mechanism whereby node A may determine whether any of the receiving nodes with which node A may potentially interfere are currently receiving data or will be receiving data.

In a similar manner, node B generates a rate prediction state based on the received confirmations. In some implementations the rate prediction state may comprise records of the information provided by each of the confirmations. Thus, node B will have information relating to scheduled transmissions of any transmitting nodes that are close to node B. In this way, the rate prediction state provides a mechanism whereby node B may determine whether any transmitting nodes that may interfere at node B are currently transmitting data or will be transmitting data.

Here, it should be appreciated that node B's neighboring nodes may be different than node A's neighboring nodes. For example, where the definition of a neighboring node is based on whether a node may receive control messages from another node, if nodes A and B are separated by a fair distance, some of the nodes that may communicate with node B may not be able to communicate with node A and vice versa. Consequently, nodes A and B may independently identify their neighboring nodes in conjunction with the interference avoidance and fairness operations described herein.

Referring again to the flowchart of FIG. 2, a sample request-grant-confirmation message exchange will be described. At block 206, a transmitting node that wishes to transmit data to a receiving node may send a request to transmit. Here, a decision by the transmitting node as to whether to issue a request may be based on its transmit constraints state (e.g., based on received control information). For example, node A may determine whether its scheduled transmission will interfere with any scheduled receptions at receiving nodes that are near node A. As will be discussed in more detail below, based on this determination node A may decide to proceed with its transmission, postpone its transmission, or alter one or more parameters associated with its transmission.

If the transmitting node determines that the transmission may be scheduled it transmits the request message to the receiving node. In the example of FIG. 4, this is represented by the request block ("R") 408.

As represented by block 208, upon receipt of the request the associated receiving node determines whether to schedule the requested transmission. Here, the receiving node's determination of whether to schedule the requested transmission may be based on its rate prediction state (e.g., based on received control information). For example, node B may determine whether it will be able to reliably receive the requested transmission in view of any scheduled transmissions by transmitting nodes that are near node B. As will be discussed in more detail below, based on this determination node B may decide to schedule the requested transmission, not schedule the requested transmission, or adjust one or more parameters (e.g., transmit timing, transmit power, transmit rate, code rate) associated with the requested transmission to enable sustainable reception of the transmission.

If the receiving node elects to schedule the transmission, it transmits a grant back to the transmitting node. In the example of FIG. 4, the grant block ("G") 418 represents the transmission and reception of the grant message by node B and node A, respectively. As mentioned above, the grant may include information relating to the scheduled transmission. Consequently, any transmitting node that receives the grant 418 may define (e.g., update or create) its transmit constraints state based on this information.

As represented by block 210 of FIG. 2, upon receipt of a grant message from an associated node, a transmitting node broadcasts a confirmation message to confirm the grant by its associated receiving node and to inform its neighboring nodes of the scheduled transmission. In the example of FIG. 4, the confirmation block ("C") 420 represents the transmission and reception of the grant message by node A and node B, respectively. As mentioned above the confirmation may include information relating to the scheduled transmission. Consequently, any receiving node that receives the confirmation 420 may define (e.g., update or create) its rate prediction state based on this information.

As represented by block 212, following transmission of the confirmation a transmitting node transmits its data during the scheduled transmission time period as represented by a transmission opportunity ("TXOP") interval 422 in FIG. 4. In some implementations, a single transmission opportunity (e.g., that is associated with a relatively long TXOP period) may be broken up into smaller segments to allow better interference management and rate selection for ongoing transmissions. In the example of FIG. 4 the scheduled transmission is defined as a series of transmit time segments 424A and 424B that are separated by a time interval 426 that is designated for receiving or transmitting control information. For example, node A may transmit data during time segment 424A, then monitor for control messages and/or transmit control messages during the time interval 426, then transmit data again during time segment 424B. It should be appreciated that the relative lengths of the time periods in FIG. 4 are not necessarily the same as those that may be used in an actual system.

By subdividing the transmission in this way, node A may adapt its transmission of data during subsequent time segments (e.g., time segment 424B) if it is determined that conditions on the communication medium have changed from the time of the initial grant 418. For example, during the time segment 424A, node B may receive additional control information (e.g., confirmation 416D) from one of its neighboring nodes. Based on this information (e.g., indicating a scheduled transmission during time segment 424B), node B may adapt its rate prediction state. In the event any change in the rate prediction state relates to channel conditions during the time segment 424B, node B may adapt the transmission parameters (e.g., transmission rate, number of redundancy bits to include and so on) for subsequent transmissions by node A.

In some implementations a receiving node may transmit transmission parameters such as these to its associated transmitting node in conjunction with an acknowledgement of a given transmission segment. In the example of FIG. 4, node B transmits an acknowledgement 428 to node A to acknowledge receipt of the segment 424A. The acknowledgement 428 also may include or be transmitted in conjunction with information that is similar to the information transmitted in the grant 418. Thus, this information may define or relate to a transmission time period, transmit power information, and other information to be used by node A for transmission of the subsequent segments (e.g., segment 424B). The acknowledgement 428 also may be used to provide this information to transmitting nodes that are close to node B so that these nodes may update their respective transmit constraints states.

In some implementations node A may monitor for control information from other nodes during the interval 426. For example, node A may receive grants or resource utilization messages whereby node A may elect to adjust its current transmission or a subsequent transmission based on the received information.

In some implementations node A may transmit a confirmation 430 during the interval 426. The confirmation 430 may include, for example, information similar to the information provided by the confirmation 420. Thus, the confirmation 430 may define or relate to a transmission time period, transmit power information, and other information to be used by node A for transmission of the subsequent segments (e.g., segment 424B). In some cases the confirmation 430 may be generated in response to the acknowledgement 428. In particular, in the event the acknowledgement 428 called for adaptation of the transmission parameters for subsequent time segments, the confirmation 430 may be used to provide this information to the receiving nodes that are close to node A so that these nodes may update their respective rate prediction states.

Referring again to FIG. 2, as represented by block 214 in some implementations after the transmitting node completes its transmission it may monitor the control channel for a defined period of time. For example, as represented by the post-TXOP monitor period 432 of FIG. 4, this period of time may immediately (or substantially immediately) follow the TXOP period 422. Through the use of this monitor period, a node may define (e.g., update or reacquire) its transmit constraints state and rate prediction state information to enable the node to subsequently initiate requests to transmit data and to generate grants that schedule the reception of data at the node. Here, it should be appreciated that the node may not have received control messages during the time periods the node was transmitting (e.g., time segment 424A and time segment 424B). For example, node A would not have received the grant 410 and a confirmation 434 that may have been transmitted by a receiving node and a transmitting node, respectively, that are close to node A. Accordingly, in some implementations these neighboring nodes may be configured to transmit this information during the post-TXOP period 432 so that node A may define its states based on this information.

In some implementations a node may be configured to delay transmission of its control information to ensure that its neighboring nodes (e.g., node A) receive this information. Here, the node may monitor the control information transmitted by its neighbors (e.g., the confirmation 420 from node A) to determine when those nodes will be transmitting. The node may then delay transmission of its control information until after the completion of its neighbor's transmit time period (e.g., time period 422). This is illustrated in FIG. 4, for example, by a grant 436 and a confirmation 438 that are received by node A during the post-TXOP period 432.

In some implementations a node may be configured to retransmit its control information to ensure that its neighboring nodes (e.g., node A) receive this information. In this case, the node may initially transmit its control information (e.g., the grant 410 or the confirmation 434) at a normal time (e.g., not delayed). However, the node also may monitor the control information transmitted by its neighbors (e.g., node A) to determine whether any of those nodes will be or were transmitting when the node transmits its control information. If so, the node may transmit additional control information that repeats information that was previously transmitted. In this case the grant 436 and the confirmation 438 that are received by node A during the post-TXOP period 432 may corresponding to "retransmitted" control information.

In some implementations the length of the post-TXOP period 432 is defined to be at least as long as the maximum length of a time segment (e.g., time segment 424A) plus the maximum length of the interval 426 in the wireless communication system. In this way, a node that is monitoring the control channel during the period 432 may be assured of receiving any acknowledgements or confirmations transmitted during the interval 426 defined for any other set of associated nodes in the system. In addition, a disadvantaged receiving node may use the period 432 to broadcast a resource utilization message ("RUM") or transmit a directed RUM to a specific node (e.g., a node associated with TXOPs that are causing unfairness to the receiving node) in an attempt to improve the quality of service at the disadvantaged receiving node. As will be discussed in more detail below, a RUM provides a mechanism whereby a node may make its neighbors back-off their transmissions, thereby enabling the node to gain access to the channel in an expedient manner. Various details regarding several sample implementations and applications of RUMs are discussed in United States Patent Application Publication No. 2007/0105574, the disclosure of which is hereby incorporated by reference herein.

Figure 5:
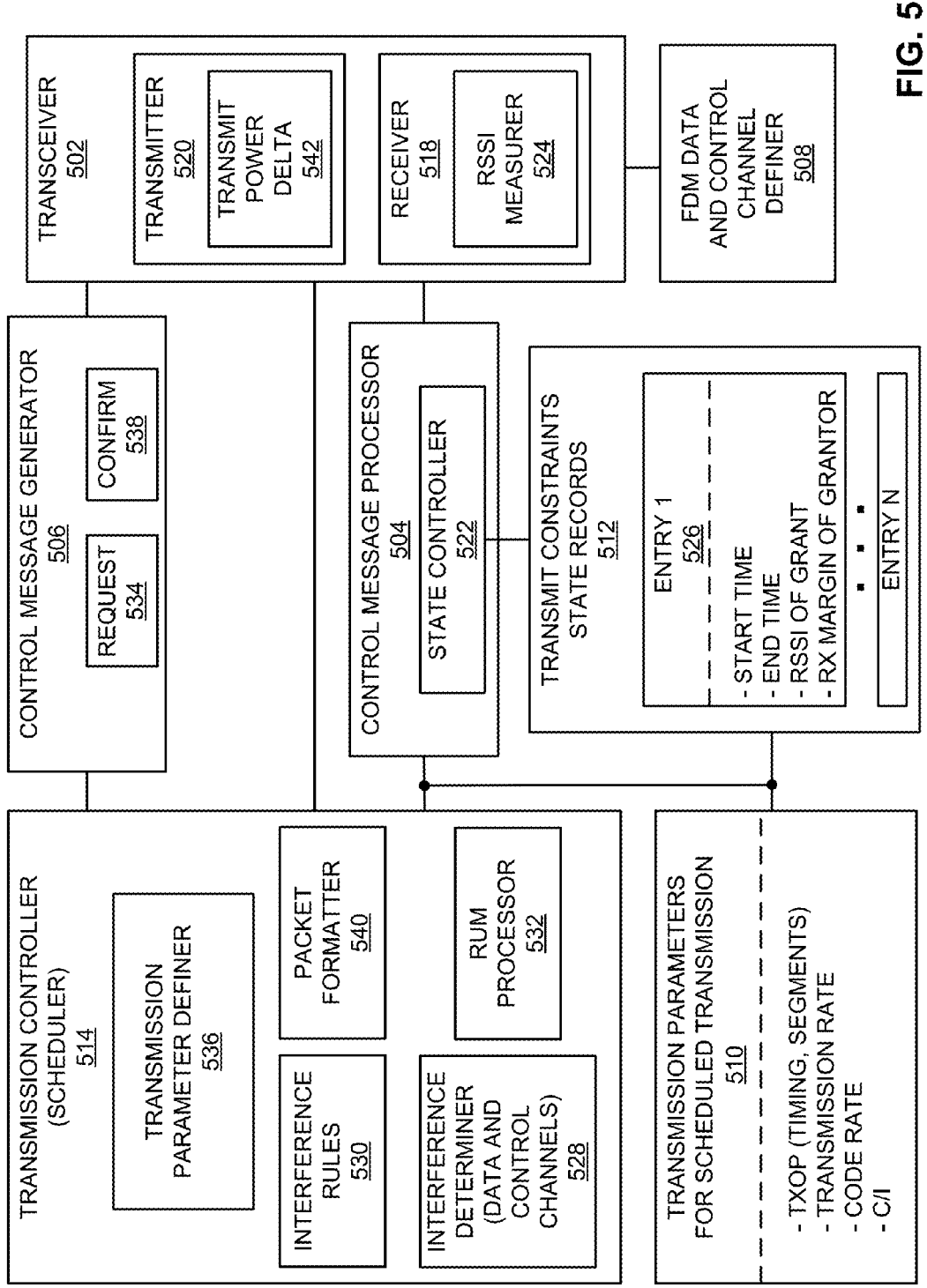
FIG. 5 is a simplified block diagram of several sample aspects of a transmitting node.
Figure 6:
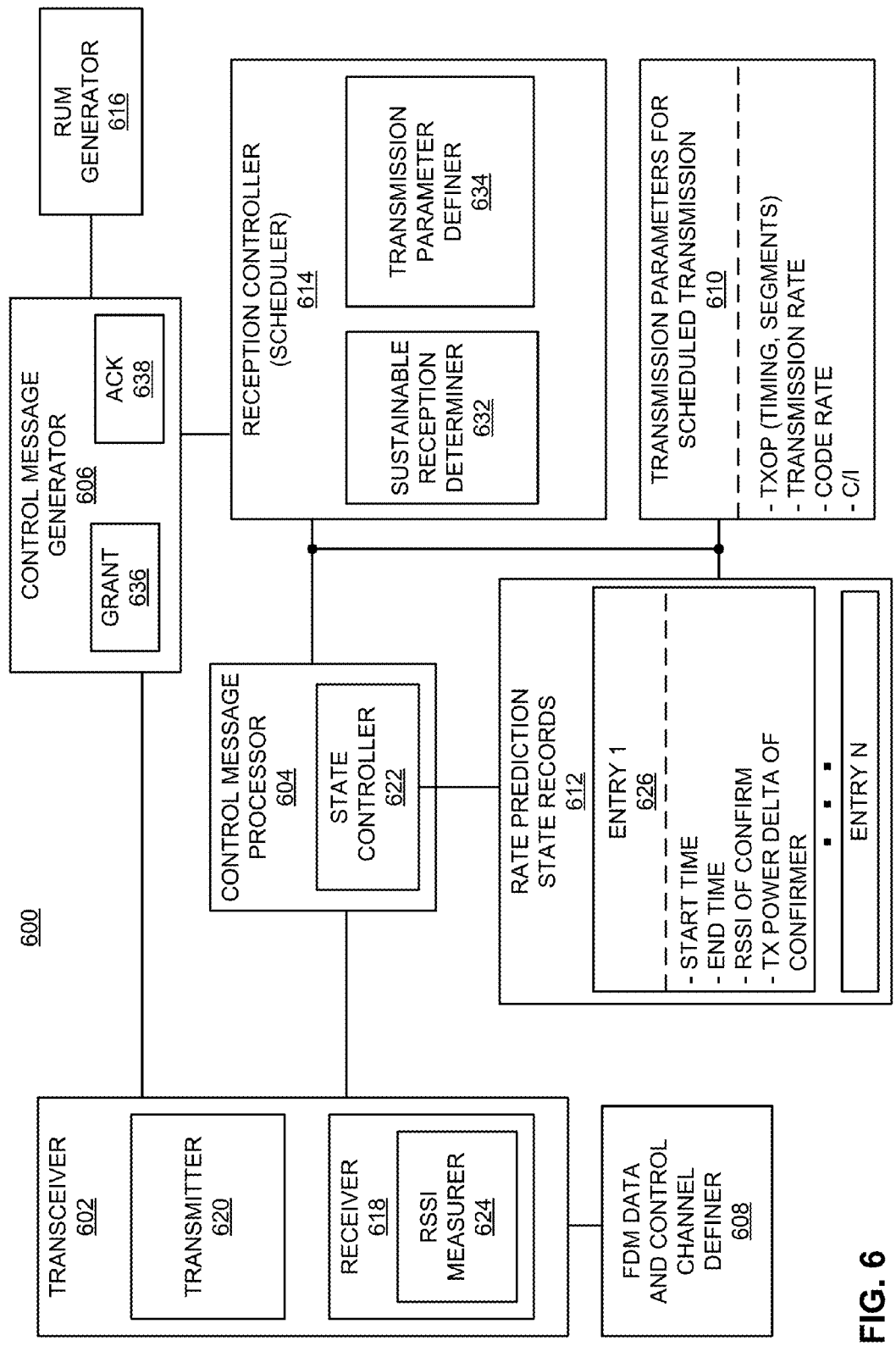
FIG. 6 is a simplified block diagram of several sample aspects of a receiving node.
Figure 7A:
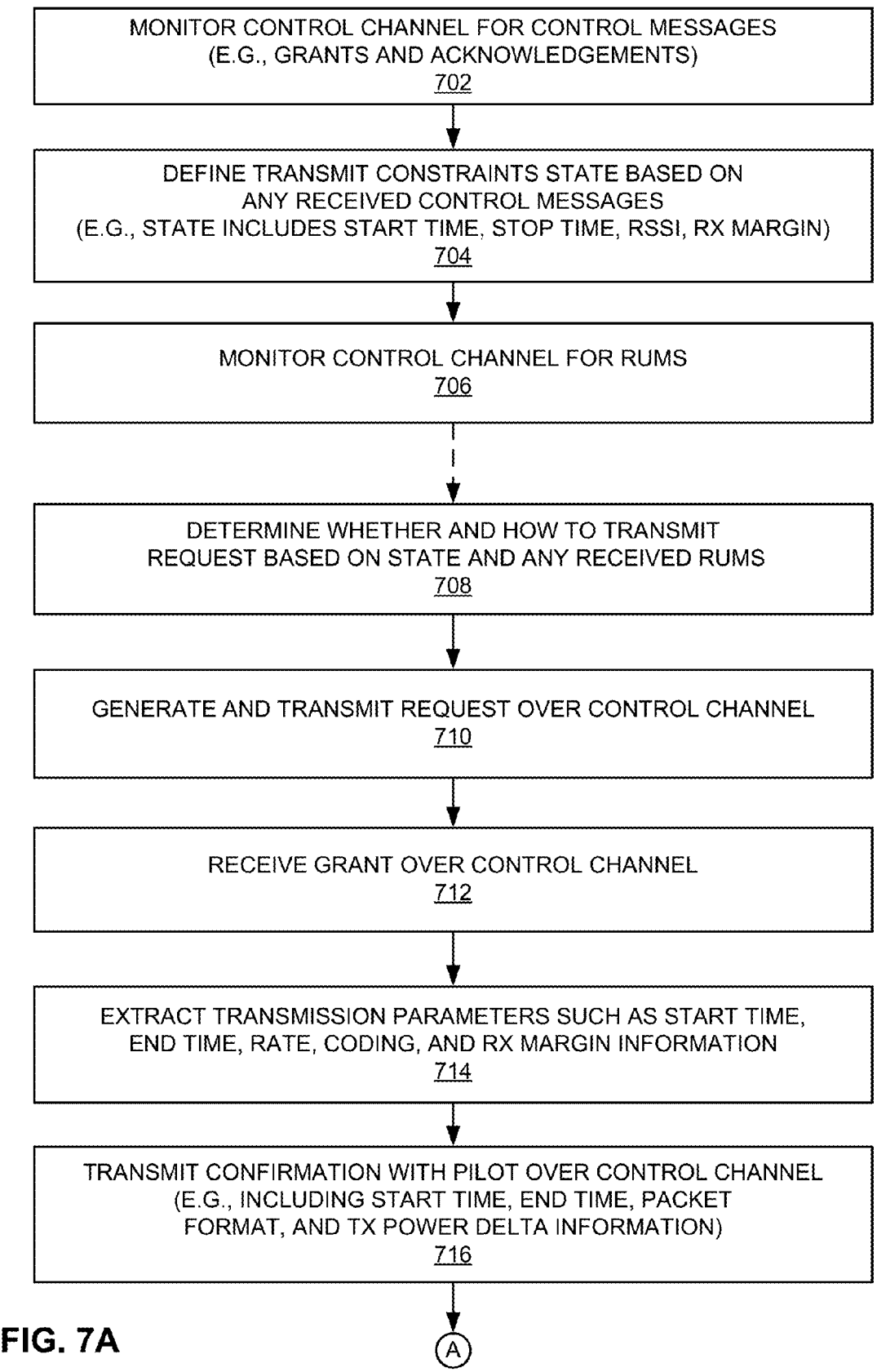
FIGS. 7A and 7B, is a flowchart of several sample aspects of operations that may be performed by a transmitting node.
Figure 7B:
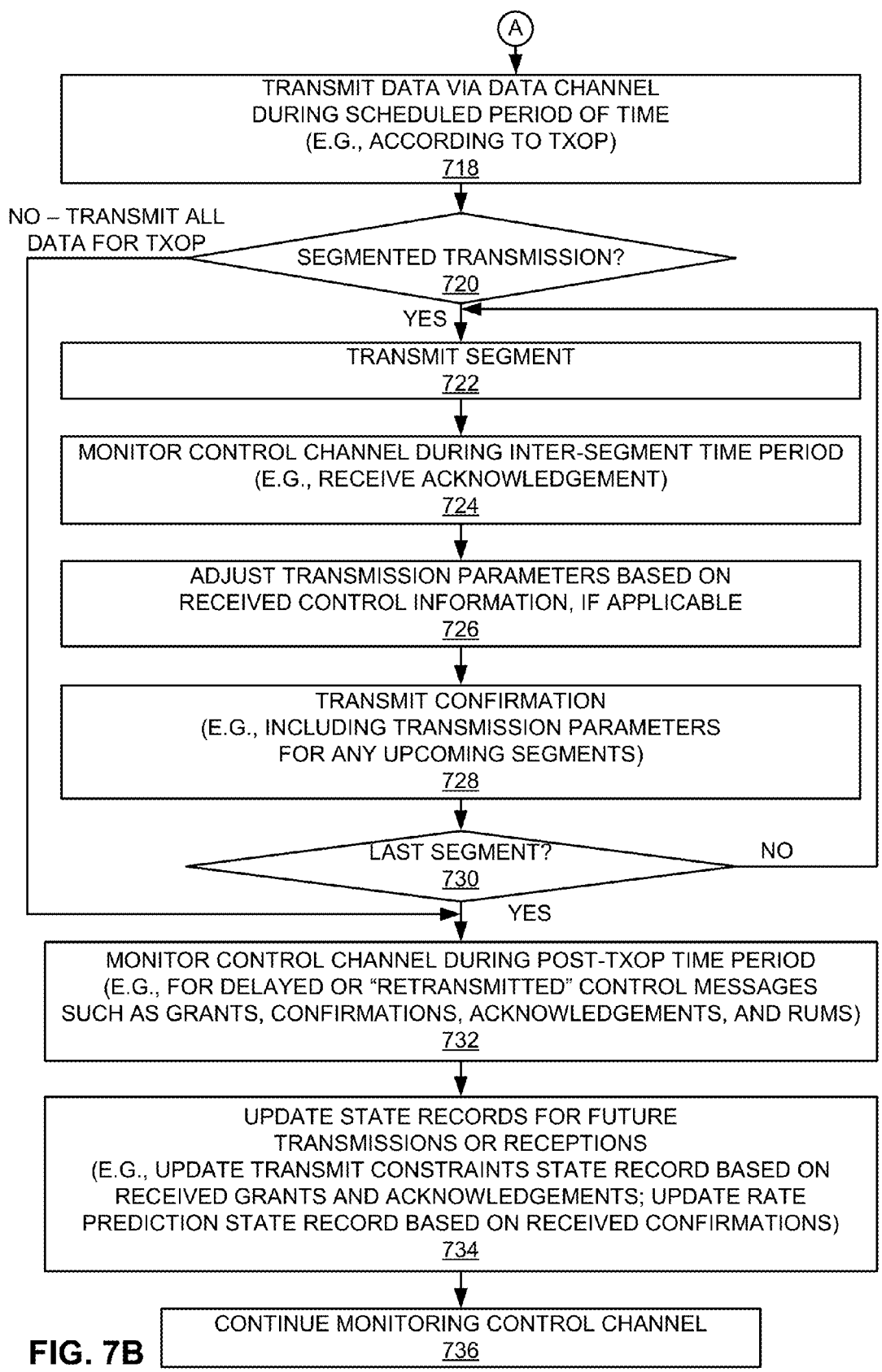
Figure 8A:
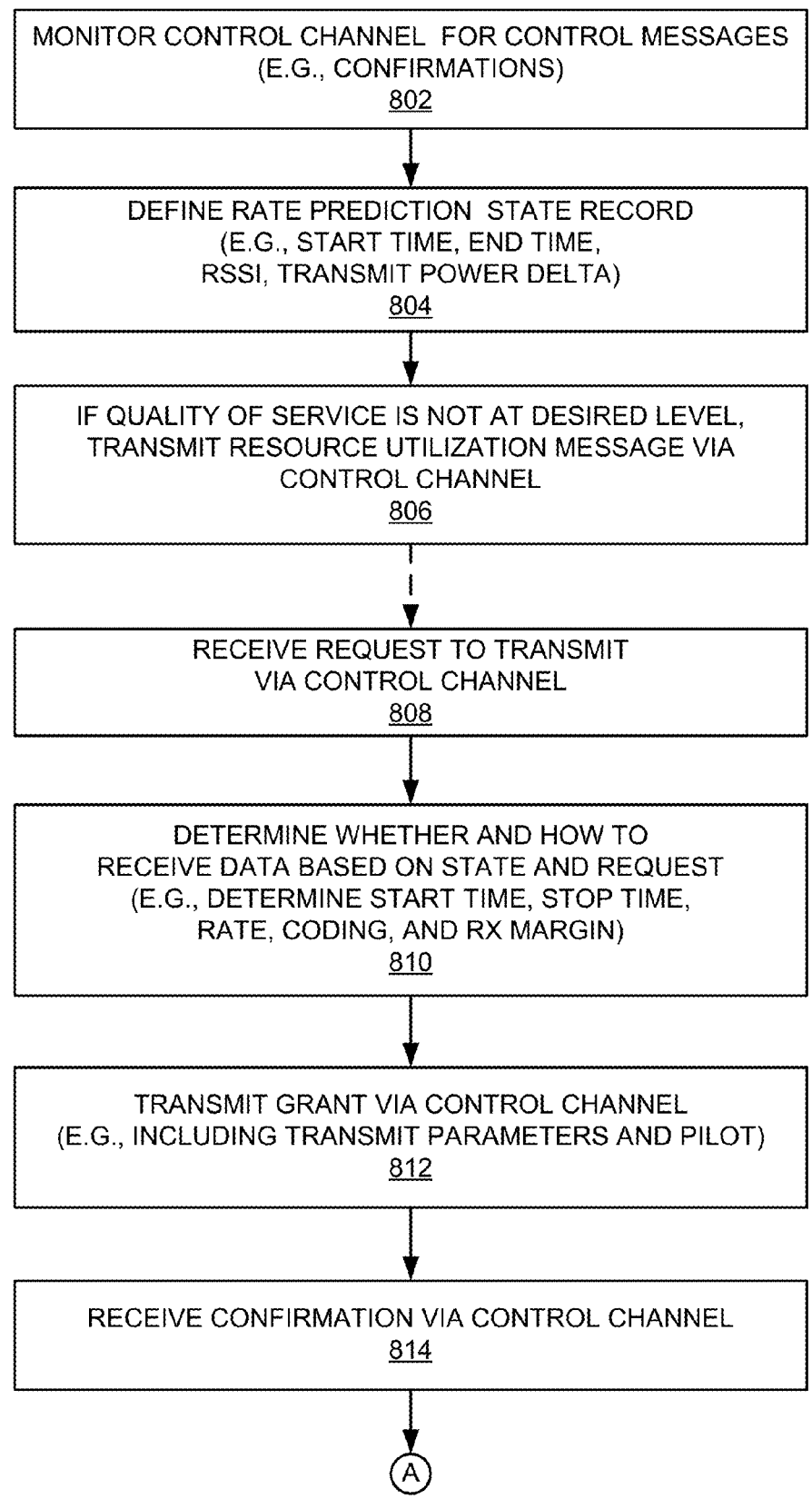
FIGS. 8A and 8B, is a flowchart of several sample aspects of operations that may be performed by a receiving node.
Figure 8B:
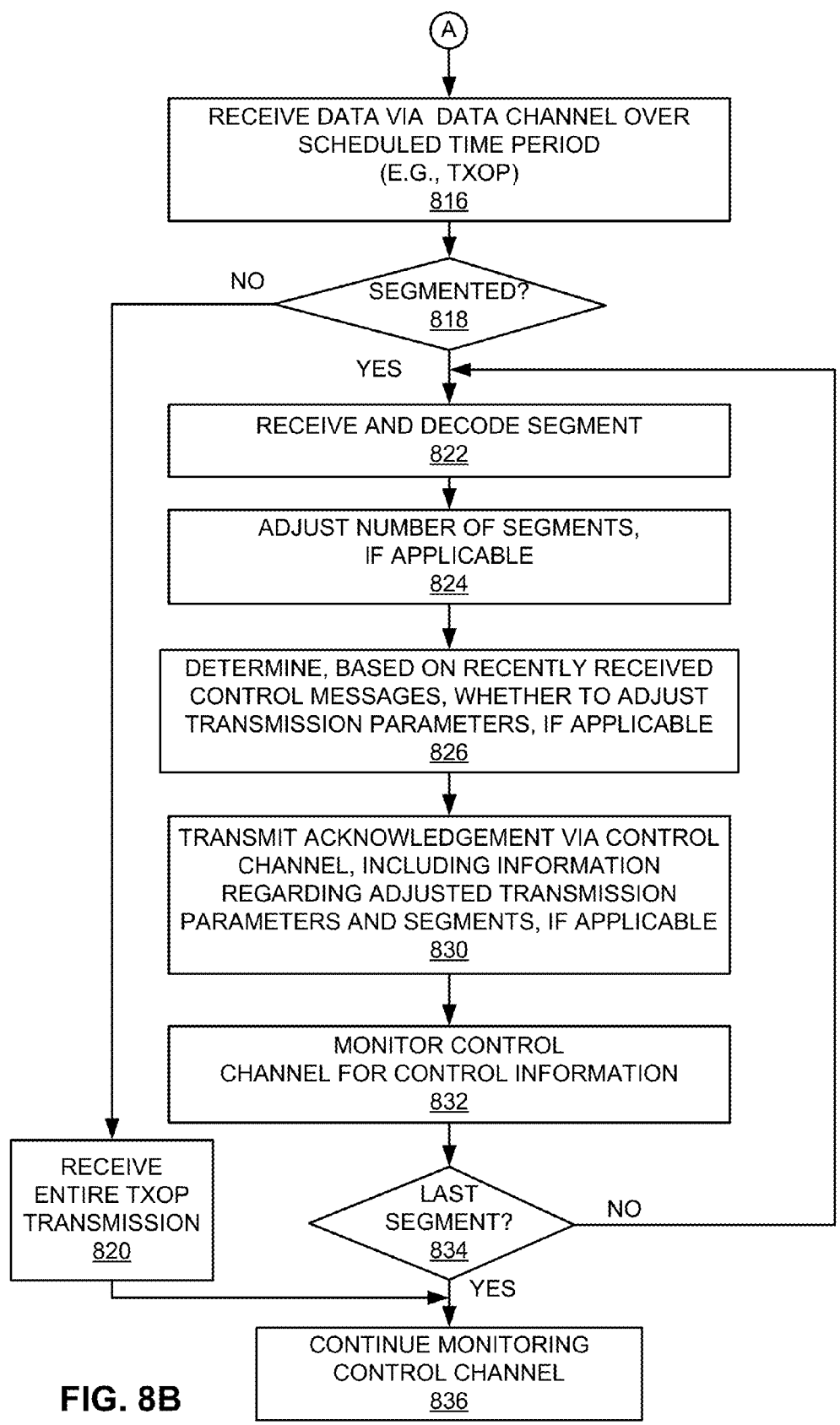

With the above description in mind, several examples of additional implementation and operational details that may be employed based on the teachings herein will be discussed in conjunction with FIGS. 5-8. FIG. 5 illustrates several sample functional components associated with a transmitting node 500 (e.g., a wireless node performing transmit operations). FIG. 6 illustrates several sample functional components of a receiving node 600 (e.g., a wireless node performing receive operations). FIG. 7 illustrates several sample operations that may be performed by a transmitting node. FIG. 8 illustrates several sample operations that may be performed by a receiving node.

Referring initially to FIGS. 5 and 6, the transmitting and receiving nodes 500 and 600 include various components for communicating with one another or other wireless nodes. For example, the nodes 500 and 600 include transceivers 502 and 602, respectively, for transmitting information (e.g., data and control information) and receiving information via a wireless medium. In addition, the nodes 500 and 600 respectively include control message generators 506 and 606 for generating control messages and control message processors 504 and 604 for processing received control messages. Channel definers 508 and 608 may cooperate to define, select, or otherwise implement the data and control channels used by the nodes 500 and 600 to communicate with one another or some other node. For example, channel definers 508 and 608 may cooperate with the transceivers 502 and 602, respectively, so that data and control information are transmitted and received via appropriate frequency bands (e.g., as illustrated in FIG. 3). The nodes 500 and 600 also include respective data memories for storing, for example, transmission parameters 510 and 610 and state records 512 and 612, respectively. In addition, the transmitting node 500 includes a transmission controller 514 for controlling various transmission-related operations of the node 500 and the receiving node 600 includes a reception controller 614 for controlling various reception-related operations of the node 600. The receiving node 600 also includes a resource utilization message ("RUM") generator 616 for generating resource utilization messages while the transmitting node 500 includes a RUM processor 532 for processing received RUMs.

Sample operations of the transmitting node 500 and the receiving node 600 will be discussed in more detail in conjunction with the flowcharts of FIGS. 7 and 8, respectively. For convenience, the operations of FIGS. 7 and 8 (or any other operations discussed or taught herein) may be described as being performed by specific components (e.g., components of the nodes 500 or 600). It should be appreciated, however, that these operations may be performed by other types of components and may be performed using a different number of components. It also should be appreciated that one or more of the operations described herein may not be employed in a given implementation.

As represented by blocks 702 and 802 the nodes 500 and 600 monitor the control channel for control messages on a regular basis. For example, in a typical configuration a receiver 518 of node 500 and a receiver 618 of node 600 will each monitor the control channel whenever the corresponding transmitter 520 and 620 of each node is not transmitting. In other words, a node may acquire control messages when it is receiving or is idle. In this way, each of the nodes 500 and 600 may acquire control information relating to scheduled transmissions associated with neighboring nodes, and thereby maintain state as discussed below.

The control message processors 504 and 604 of each node process each received control message and extract the transmission schedule and other information from the message. As discussed above, a received control message may comprise a grant, a confirmation, an acknowledgement, or some other suitable control information. Here, for a node that wishes to transmit (i.e., a transmitting node), grants and acknowledgements generated by neighboring receiving nodes are of particular interest since the transmitting node will use the information provided by these control messages to determine whether it will interfere with scheduled receptions of its neighbors. Conversely, for a node that wishes to receive (i.e., a receiving node), confirmations generated by neighboring transmitting nodes are of particular interest since the receiving node will use the information provided by these control messages to determine whether it may receive data on a sustainable basis in view of scheduled transmissions by these nodes.

As mentioned above, a grant or an acknowledgement may include information relating to a granted resource and the timing and duration of the corresponding granted TXOP. These timing parameters may include, for example, the start time for the TXOP, the end time for the TXOP, and the duration of the TXOP. In some implementations these timing parameters may be relative to the transmission time of the message or to some other timing reference.

A grant or acknowledgement also may include transmission parameters that were defined at the receiving node to facilitate reliable reception of a transmission at the receiving node. As mentioned above, the receiving node may define these parameters based on scheduled (e.g., ongoing or future) transmissions by nodes that are in the vicinity of the receiving node. This information may include, for example, recommended or designated transmission parameters such as transmit power, transmission rate, a quantity of redundancy bits to transmit, and code rate to be used by an associated transmitting node during the scheduled transmission.

In some implementations a grant or acknowledgement may indicate a channel-to-interference ratio ("C/I") expected at the receiving node. In this case, an associated transmitting node may use this information to define appropriate transmission parameters.

In some implementations a grant or acknowledgement may indicate the receive margin at the receiving node. This receive margin may indicate, for example, how much margin (e.g., defined in decibels) is built into the transmission parameters provided by the control message. Consequently, a transmitting node may use the receive margin information to ensure that any interference caused by its overlapping transmissions will be low enough such that an error correction mechanism (e.g., HARQ) at the receiving node will be able to recover the associated packet.

In some implementations a grant or acknowledgement may comprise or be associated with a pilot signal that a neighboring node may use to determine to what extent a specific transmit power value will affect (e.g., interfere with) the receiving node. For example, the pilot signal may be associated with a fixed and known power spectral density or transmit power whereby the transmitting node may use this known information to determine the path loss to the neighboring receiving node. To this end, the receiver 518 may include a received signal strength indication ("RSSI") measurer 524 that may be used to measure the signal strength of the received signal (e.g., pilot). In some implementations, this pilot signal may be sent over one or more of the control sub-channels, so that a sample of the entire channel can be reliably obtained (e.g. for advantage in a channel with frequency selective fading).

In some implementations a confirmation may include information that is similar to the information described above in conjunction with the grant and acknowledgement, except that in this case the information is from a neighboring node that will be transmitting during the scheduled transmission period. For example, a confirmation may include the start time for the TXOP, the end time for the TXOP, the duration of the TXOP, transmit power, transmission rate, a quantity of redundancy bits to transmit, and code rate.

A confirmation may also comprise or be associated with a pilot signal. Again, the pilot signal may be associated with a fixed and known power spectral density or transmit power whereby a receiving node may determine the path loss to the transmitting node. Thus, the receiver 618 also may include an RSSI measurer 624 that may be used to measure the signal strength of a received confirmation signal (e.g., pilot).

In some implementations a confirmation may indicate the transmit power delta to be used by the transmitting node for its scheduled transmission. This power delta may indicate, for example, the difference (e.g., increase or decrease) between the power level of a message to be transmitted during the scheduled transmission and the power level of the confirmation (e.g., the associated pilot signal). Through the use of the transmit power delta and the measured power level of the received confirmation, a receiving node may determine how much interference it can expect from the neighboring transmitting node. For example, based on the received confirmations for previously scheduled transmissions, the receiving node may construct a profile (e.g., state records) of received interference level versus time.

As represented by blocks 704 and 804, state controllers 522 and 622 define the state records for each node based on the received control information. Here, as new control information is received, it is added to the appropriate state record. Conversely, upon completion of a given TXOP (e.g., as indicated by comparing the end time of the TXOP with the current time), the associated record is removed from the state record.

The transmit constraint state records 512 are shown in FIG. 5 since these records are of particular interest for the transmitting node 500. As mentioned above, the transmit constraint state includes records of received grants and in some implementations received acknowledgements. Thus, an entry 526 of the state records 512 for a given received message may include the start time of a scheduled transmission (or the current time if the transmission is in progress), the corresponding end time, a transmission time period, receive margin, the RSSI associated with the received message, C/I, and the receive margin of the node that transmitted the message (e.g., a node that sent the grant or acknowledgement).

The rate prediction state records 612 are shown in FIG. 6 since these records are of particular interest for the receiving node 600. The rate prediction state includes records of received confirmations. Thus, an entry 626 of the state records 612 for a given received message may include the start time of a scheduled transmission (or the current time if the transmission is in progress), the corresponding end time, a transmission time period, the RSSI associated with the received message, and the transmit power delta of the node that transmitted the message.

Referring now to blocks 806 and 706 of FIGS. 8 and 7, in some implementations the nodes in a system may implement a resource utilization message ("RUM") scheme in an attempt to ensure that the resources of the system are shared between nodes in a fair manner. In general, the operation of block 806 involves transmitting messages over the control channel to indicate that the receiving node is disadvantaged (e.g., due to interference the node "sees" while receiving) and that the node desires priority access to the shared communication medium (e.g., a given data channel). At block 706 of FIG. 7, the transmitting node monitors the incoming traffic on the control channel to determine whether any of its neighboring nodes have transmitted a RUM. This information is then taken into account whenever the transmitting node wishes to invoke a request to transmit. Sample operations relating to a RUM-based scheme will be treated in more detail in conjunction with FIG. 9.

Figure 9A:
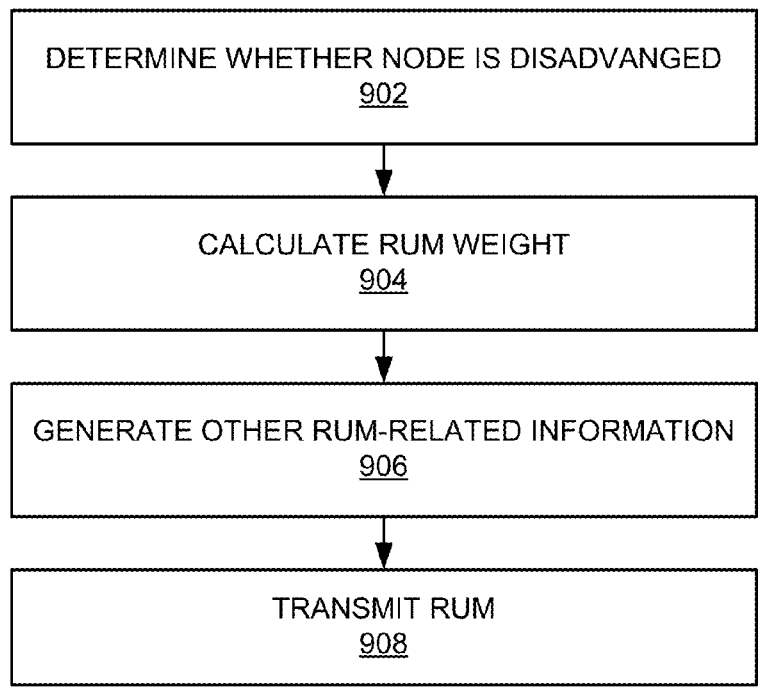
FIGS. 9A and 9B, are flowcharts of several sample aspects of operations that may be performed in conjunction with a resource utilization message-based fairness scheme.

As represented by block 902 in FIG. 9A, at some point in time (e.g., on a regular basis) the receiving node determines whether it is receiving data in accordance with an expected quality of service level (e.g., an expected data rate or latency). In some cases the quality of service may be lower than expected due to interference from neighboring transmitting nodes. For example, the receiving node may be unable to grant a request to transmit from associated transmitting node due to the scheduled transmissions of the neighboring nodes. In the event the receiving node determines that it is disadvantaged, it may generate a RUM in an attempt to cause neighboring nodes to interfere less. The response by the neighboring nodes may be in terms of contending less for transmission on the data channel for a period of time by requesting less frequently or lowering power or other suitable means to satisfy the RUM-sending node.

As represented by block 904, in some implementations, a RUM may be weighted (e.g., include a weight value) to indicate the degree to which reception at a receiving wireless node is not meeting a desired level of quality of service (e.g., the degree to which the receiving node is disadvantaged). For example, the disadvantaged receiving node may calculate a RUM weight value that indicates the degree to which the expected receive data rate differs from the actual receive data rate (e.g., a ratio of the two values).

As represented by block 906, in practice a RUM may include various types of information. For example, in some implementations a RUM may designate a level of desired interference reduction. In addition, in some implementations a RUM may indicate a particular resource that the disadvantaged receiving node wishes to be cleared.

As represented by block 908, the receiving node then transmits the RUM via the control channel. In the example of FIG. 6, the RUM generator 616 may generate the above RUM-related information. The control message generator 606 may then cooperate with the transmitter 620 to transmit the RUM over the control channel.

As represented by block 708 in FIG. 7, the transmitting node determines whether or how to issue a request to transmit based on the transmit constraints state and, optionally, any received RUMs. In some aspects the request indicates that the transmitting node has data to be transmitted to its associated receiving node (or nodes). In addition, the request may serve to indicate there are no ongoing transmissions that prevent the transmitting node from transmitting the data.

If it was determined at block 706 that a neighboring node has transmitted a RUM, the transmitting node may utilize the receipt of the RUM, the weight thereof, and any other information included in the RUM to determine an appropriate response. For example, the transmitting node may limit its future transmissions or it may ignore the RUM if, for instance, the node has received a RUM from an associated receiving node that indicates that the associated receiving node is more disadvantaged than any other neighboring receiving node.

Figure 9B:
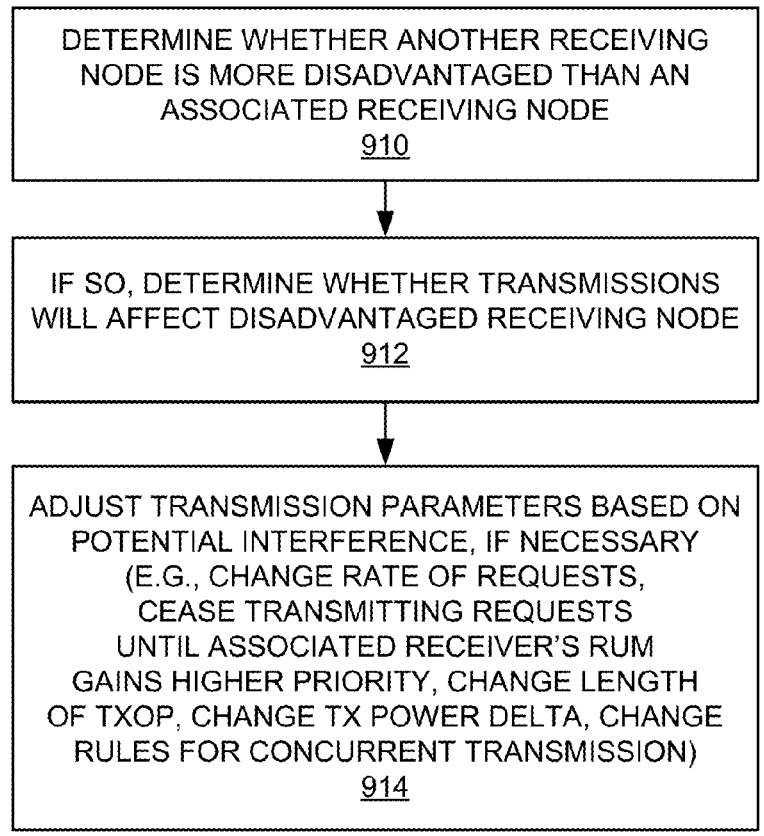

Referring to FIG. 9B, at block 910 the RUM processor 532 of the transmitting node 500 determines whether a received RUM indicates that a neighboring receiving node is more disadvantaged than the receiving node associated with the transmitting node. As a preliminary measure, at block 912 an interference determiner 528 may determine whether the transmitting node's transmission would even interfere with the disadvantaged receiving node (e.g., as discussed above). This may involve, for example, comparing receive power information (e.g., RSSI of a pilot signal) associated with a received RUM with an appropriate threshold level. If it is determined that the transmit power to be used during the transmission is sufficiently low or that other parameters of the desired transmission (e.g., transmit times) would not lead to undue interference at the disadvantaged receiving node, the transmitting node may ignore the received RUM.

At block 914, in the event the transmitting node determines that the desired transmission may interfere with reception at the disadvantaged receiving node, the transmitting node 500 may take appropriate action (e.g., define different transmission parameters) to avoid such interference. For example, the transmitting node 500 (e.g., the transmission controller 514) may perform one or more of: delay sending of a request to transmit, abstain from transmitting request messages until a resource utilization message of an associated receiving node indicates a higher degree of disadvantage than the received resource utilization message, send a request that requests to transmit at a later time, change (e.g., decrease) a rate at which the node transmits request messages, change (e.g., decrease) a length of a transmit time period (e.g., TXOP), send a request to transmit at a different (e.g., reduced) power level, change (e.g., reduce) a transmit power delta, modify a set of rules (e.g., one or more rules 530) relating to a degree to which transmission by a node may interfere with reception at a neighboring node (e.g., change a margin of safety), or perform some other suitable action.

The transmitting node may perform reciprocal operations when the received RUMs indicate that the receiving node associated with the transmitting node is more disadvantaged than other nodes. For example, in this case the transmitting node may increase the rate at which it transmits requests, increase the length of its TXOP, and so on.

As mentioned above, a transmitting node also may limit a request based on the current state. In the example of FIG. 5, the interference determiner 528 may use the transmit constraints state records 512 to determine whether a desired transmission will interfere with any scheduled reception of data at nodes that are relatively close to the transmitting node. Such a determination also may be made based on one or more interference rules 530 that may define, for example, margins relating to an acceptable level of interference for a given transmission rate, coding scheme, or other conditions. As an example, based on the RSSI of any received grants along with the receive margin information, a node may determine whether it should request an overlapping transmission and, if so, how to select the transmit power to limit potential interference with any scheduled transmissions. If the interference determiner 528 determines that a desired transmissions may unduly interfere with receptions at one or more neighboring nodes, the transmitting node 500 may elect to, for example: abstain from transmitting the request to transmit, delay sending of a request to transmit, send a request that requests to transmit at a later time, send a request to transmit at a reduced power level, adjust a transmit time period (e.g., TXOP), or take some other suitable action. For example, if a transmitting node elects to transmit at a lower power level, it may still want to send the same number of bits per packet. In this case, the transmitting node may specify a longer TXOP.

Figure 10:
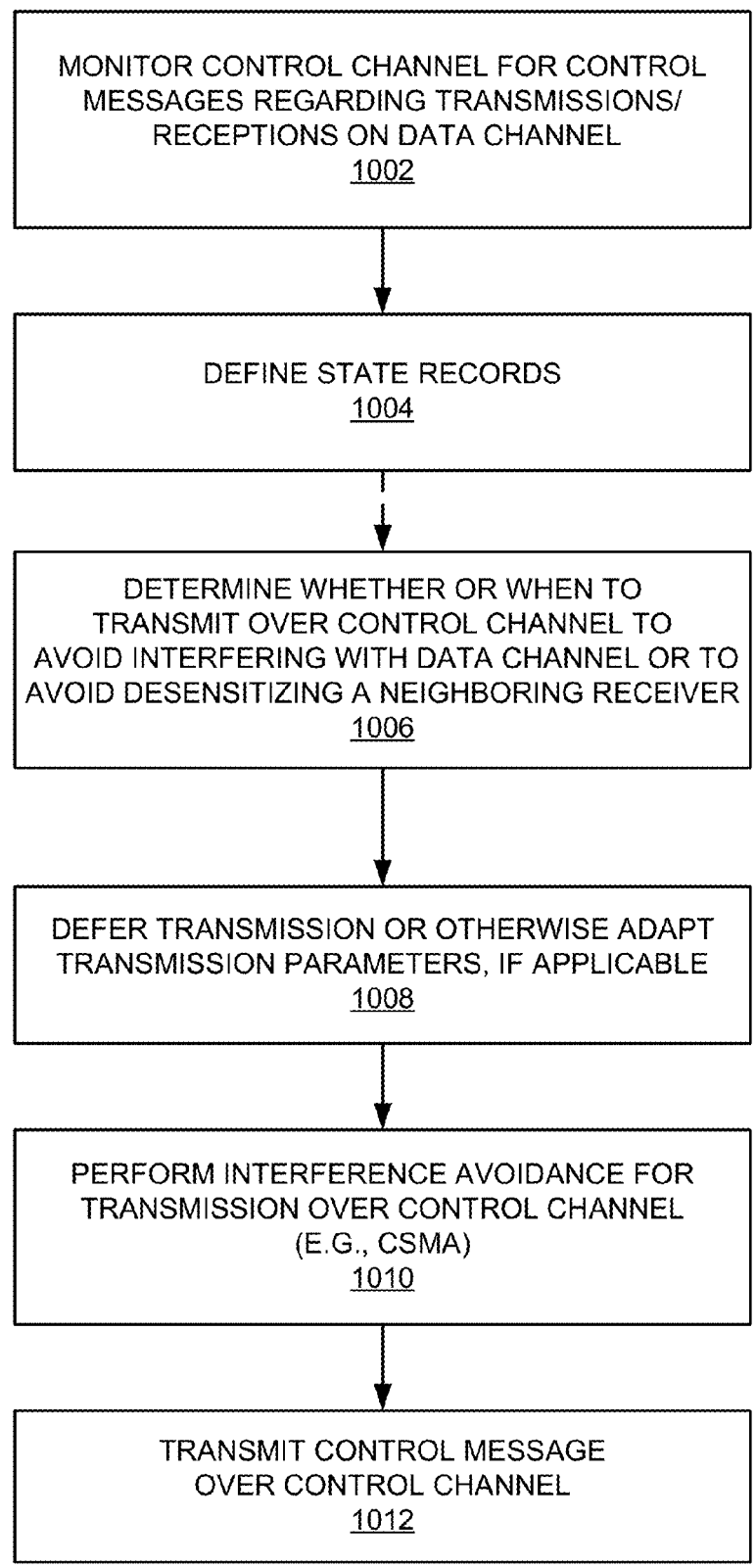
FIG. 10 is a flowchart of several sample aspects of operations that may be performed in conjunction with determining whether to transmit over a control channel.

Techniques such as those discussed above regarding whether to issue a request to transmit data also may be used to determine whether to transmit via the control channel. For example, if a node uses a relatively excessive amount of power to transmit over the control channel, that node's transmission of control information may interfere with the reception of data at a neighboring node. In particular, this may occur when the data transmitting node that is associated with the data receiving node is further from the data receiving node than the node that is transmitting over the control channel. Such interference also may occur when the frequencies associated with the transmission of the control information and the reception of data are relatively close. As an example of the latter, referring to FIG. 3 the frequency band of the portion of the data channel being used (e.g., sub-channel 306D) may be relatively close in frequency to the frequency band of the portion of the control channel being used (e.g., sub-channel 304D). Operations relating to addressing the above near-far issue will be discussed in more detail in conjunction with FIG. 10. In certain cases, a node's transmission could desensitize a receiver in its immediate neighborhood causing saturation and loss of packets at the receiver (also known as receiver jamming) This would happen even if the transmission is frequency separated from the reception. Determination of whether to transmit on a control channel based on the likelihood of desensitizing a receiver in the neighborhood is also part of the transmit constraints state processing.

As represented by block 1002, a node that wishes to transmit over the control channel will monitor the control channel for information indicative of whether any neighboring receiving nodes have scheduled (e.g., granted) any requested transmissions. At block 1004 the node will thus define its state records (e.g., transmit constraints state) as discussed herein.

At block 1006, at some point in time the node may determine that it wishes to transmit over the control channel. In this case, the node may utilize the transmit constraints state information as well as transmission parameters associated with the intended control channel transmission to determine whether the desired transmission will interfere with neighboring receptions or will desensitize a neighboring receiver. This may involve, in a similar manner as discussed herein with other similar operations, determining whether and how to schedule the desired transmission. For example, in some implementations a decision may be made to proceed with the transmission, delay the transmission, or change some parameter associated with the transmission (block 1008).

In some implementations the transmit power to be used to transmit a control message may not be adjusted in an attempt to avoid interference. For example, in some cases it is desirable to ensure that control messages are transmitted with a certain power level to enable nodes that receive the control message to make interference avoidance decisions based on the received power level of the control message (e.g., as discussed herein). Thus, in these cases, interference avoidance may involve adjusting the timing of the transmission or some other parameter that does not affect the transmit power. In cases where interference avoidance may not be avoided by rescheduling the transmission of the control channel messages (e.g., transmitting at a later time), interference between the control and data channels may be addressed through the use of the guard bands discussed above and/or increased margin.

At block 1010, once the node determines that it may transmit over the control channel without causing undue interference with data reception at neighboring nodes, the node may invoke the access scheme designated for the control channel. For example, to avoid latency on the control channel nodes may transmit on the control channel one at a time. Some implementations may employ an interference avoidance scheme such as carrier sense multiple access with collision avoidance ("CSMA/CA"). In this way, operation on the FDM control channel may be essentially limited only by the signal-to-noise ratio of the channel. In some implementations no reservations or NAV settings are permitted since the node that is transmitting on the data channel may not be able to listen to the control channel to maintain NAV settings. Once the node gains access to the control channel, the node may then transmit its control message over the control channel as discussed herein (block 1012).

At block 710 in FIG. 7, in the event a decision is made to issue a request to transmit, the control message generator 506 generates an appropriate request message 534 including, for example, requested start and end times or some other parameters discussed herein relating to the desired transmission. The transmitter 520 then transmits the request over the control channel.

Referring again to FIG. 8, the receiving node receives the request to transmit at block 808. At block 810 the receiving node determines whether to schedule the requested transmission and, if so, how to schedule the transmission. As mentioned above, this decision may be based on the parameters of the request and on the rate prediction state.

In the example of FIG. 6, a sustainable reception determiner 632 uses the rate prediction state records 612 to determine whether it is possible to maintain sustainable reception of data at the receiving node 600 in view of any scheduled transmissions by nodes that are close to the receiving node (e.g., by selecting different parameters). For example, the node may determine an anticipated level of interference, and thereby determine a sustainable rate for the schedule transmission, based on the RSSI of any received confirmation messages and the transmit power delta information. In the event the anticipated interference is excessive, the receiving node may simply not respond to the request to transmit. In this case, the transmitting node may back-off and attempt a request at a later time.

A variety of factors may be taken into account when deciding whether to schedule an overlapping transmission. For example, such a decision may take into account the signal strength of the most recent grant. An additional consideration may be whether the grant sender has recently transmitted a RUM indicating a relatively high degree of disadvantage. Also, the amount of data that needs to be sent may factor into the decision as to whether to schedule an overlapping transmission. For example, if the amount of data to be sent is relatively small, the data may be sent at low power and over a longer period of time to facilitate the overlapping of transmissions.

In the event the receiving node elects to schedule the transmission, a transmission parameter definer component 634 may define one or more transmission parameters 610 to facilitate effective reception of the scheduled transmission (e.g., select different parameters). For example, the transmission parameters 610 may include one or more of: transmission start time, transmission end time, transmission time period, time segment definitions, transmission power, a quantity of redundancy bits to transmit, receive margin, C/I, or code rate that may be used during the transmission or that may be used to define one or more transmission parameters.

At block 812, the control message generator 606 generates a grant message 636 including information relating to, for example, the assigned TXOP period, designated bandwidth for the transmission, rate assignment, and any other grant-related parameter discussed herein. The transmitter 620 then transmits the grant via the control channel.

At block 712 in FIG. 7, the receiver 518 (FIG. 5) receives the grant via the control channel. As discussed above, the RSSI measurer 524 may measure signal strength or some other power-related parameter associated with the received grant message.

At block 714, the control message processor 504 extracts the transmission parameter-related information from the grant message. In addition, a transmission parameter definer 536 may, as necessary, determine any transmission parameters that were not directly provided by the grant. As discussed above the transmitting node 500 may maintain its transmission parameters 510 in a data memory for subsequent use by the transmission controller 514 and the control message generator 506.

At block 716, the control message generator 506 generates a confirmation 538 (e.g., in response to the received grant). In general, the transmission of the confirmation 538 immediately precedes the transmission of the data over the data channel.

In some implementations the confirmation may include information relating to the scheduled transmission as discussed herein. For example, the confirmation 538 may include a transmission start time, a transmission end time, packet format and a sequence number information as provided by, for example, a packet formatter 540, and transmit power delta information 542. The transmitter 520 transmits the confirmation message (e.g., in conjunction with the pilot signal) via the control channel.

As represented by block 814 in FIG. 8, the receiving node and any other nodes in the vicinity of the transmitting node receive the confirmation. Here, the other nodes may thus update their state information based on the confirmation. For the associated receiving node the confirmation indicates the chosen transmission mode and the packet format (e.g., for HARQ). In some implementations the packet format indication may be provided in-band (or implicitly) rather than explicitly in the confirmation message.

In a typical implementation the grant issued at block 812 specifies that the transmitting node may commence its TXOP immediately after it receives a grant. In some cases, however, the grant may indicate a later start time for the TXOP. In the event the TXOP starts at a later point in time the transmitting and receiving nodes may commence the actual data exchange by invoking an acknowledgement/confirmation exchange (not shown in FIGS. 7 and 8) to provide updated state information for the nodes.

As represented by block 718 of FIG. 7, the transmitting node 500 transmits its data via the data channel during the scheduled TXOP period. Here, if the TXOP is not segmented the transmitting node 500 transmits the data for the entire TXOP (block 720). Otherwise, as discussed below, the transmitting node transmits the data in segments. The transmitting node 500 transmits the data using the current transmission parameters 510 and the transmit power delta 542 to determine the appropriate transmission times, transmission rate, code rate, and so on. The transmitted data is then received via the data channel by the receiving node 600 as represented by block 816 of FIG. 8. If the TXOP is not segmented the receiving node 600 receives the data for the entire TXOP (blocks 818 and 820). Otherwise, as discussed below, the receiving node receives the data in segments.

Figure 11:
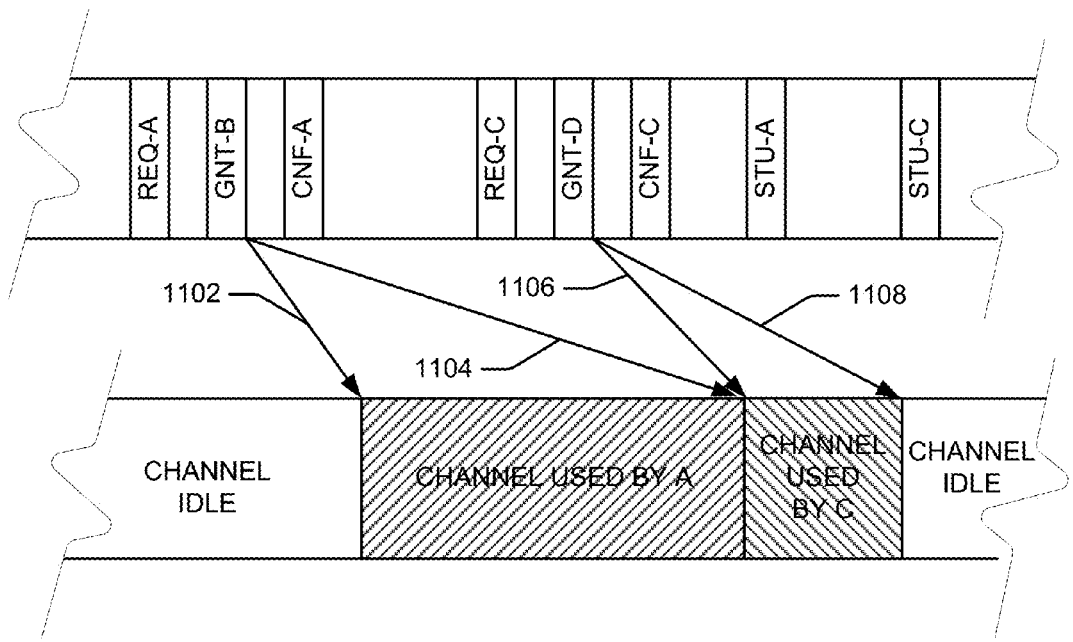
FIG. 11 is a simplified timing diagram of several sample aspects of a message exchange scheme illustrating an example where nodes transmit at different times.
Figure 12:
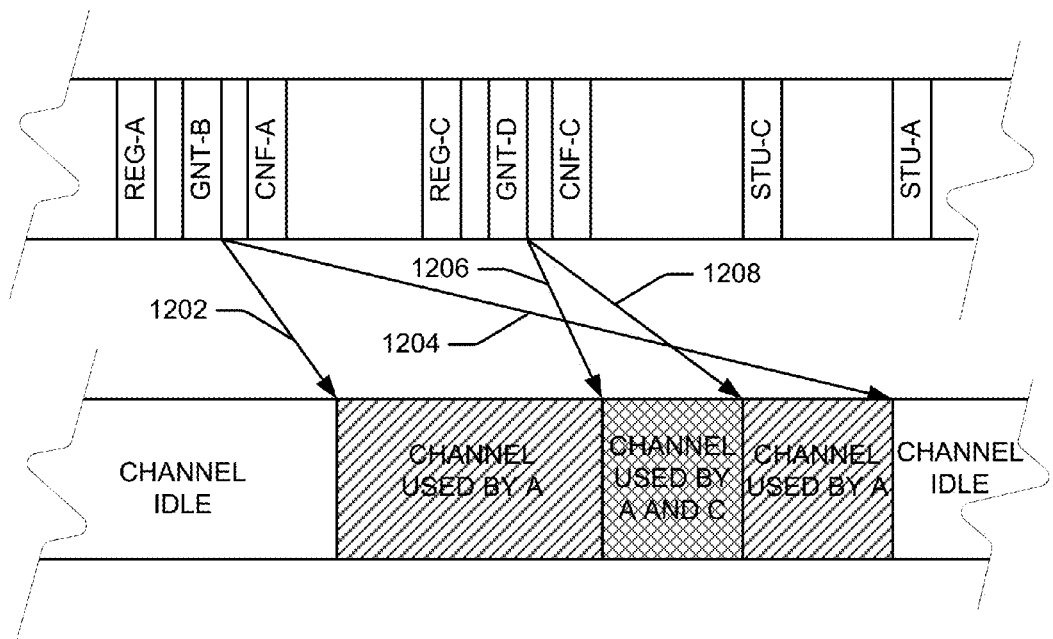
FIG. 12 is a simplified timing diagram of several sample aspects of a message exchange scheme illustrating an example where nodes transmit at the same time.

FIGS. 11 and 12 illustrate two examples of how a transmission may be scheduled in view of a scheduled transmission of a neighboring node. In FIG. 11, a node A issued a request (REQ-A) that was granted by a node B. The grant (GNT-B) from node B defined a start time and an end time for the TXOP as represented by the lines 1102 and 1104, respectively. Upon transmission of a confirmation message (CNF-A), node A commenced transmission of its data as represented by the shaded portion of FIG. 11 associated with the data channel being used by node A.

At a later point in time, a node C issues a request (REQ-C) that was granted by a node D. In this case, node D elected to avoid any overlap with the scheduled transmission for node A. As discussed herein, this election may be made based on a determination that the transmissions from node A would unduly interfere with the reception of data at node D. Accordingly, the grant (GNT-D) from node D defined a start time and an end time for this TXOP as represented by the lines 1106 and 1108, respectively. Upon transmission of its confirmation message (CNF-C), node C commenced transmission of its data at the designated time as represented by the shaded portion of FIG. 11 associated with the data channel being used by node C.

In FIG. 12, node A again issued a request (REQ-A) that was granted by a node B. This grant (GNT-B) from node B defined a start time and an end time for the TXOP as represented by the lines 1202 and 1204, respectively. After transmitting its confirmation message (CNF-A), node A transmitted its data as represented by the shaded portion of FIG. 11 associated with the data channel being used by node A.

Again, node C issues a request (REQ-C) that was granted by a node D. In this case, however, node D elected to overlap the transmission destined for node D with the scheduled transmission for node A. Here, the grant (GNT-D) from node D defined a start time and an end time for this TXOP as represented by the lines 1206 and 1208, respectively. Thus, as represented by the crosshatched portion of FIG. 11, the data channel may be concurrently used by both nodes A and C. Here, it should be appreciated that this technique may serve to provide greater spatial reuse efficiency as compared to media access control schemes where a transmitter will only use a communication medium (e.g., a channel) when that medium is free of any other transmission.

Referring again to blocks 720 and 818 of FIGS. 7 and 8, respectively, in some implementations a given TXOP may define several transmit time segments (e.g., time segments 424A and 424B in FIG. 4). In some cases a two-way exchange employing acknowledgement and confirmation messages may be used to maintain state and update transmission parameters, as necessary, throughout the TXOP.

At blocks 722 and 724, after the transmitting node transmits a given segment the node may monitor the control channel during at least a portion of the defined inter-segment time interval. For example, during this interval (e.g., interval 426 in FIG. 4) the transmitting node may receive an acknowledgement from the associated receiving node that acknowledges receipt of the most recently transmitted segment. In addition, the transmitting node may receive other control information during this interval that may be used to update the state records (e.g., transmit constraints state and rate prediction state) of that node as discussed herein. Also, the transmitting node may receive an indication from the receiving node that the transmission may be terminated.

As represented by block 822 of FIG. 8, the receiving node receives each segment and decodes the corresponding data, as necessary. At block 824, in the event the receiving node has successfully decoded all of the data to be transmitted during a TXOP (e.g., an entire packet), the receiving node may define control information to be sent to the transmitting node that indicates that the transmission is over. In the event the packet was successfully decoded even though one or more segments remain scheduled to be transmitted, this control information may indicate, for example, that the duration of the TXOP is to be adjusted (i.e., decreased) or that one or more upcoming time segments are to be eliminated (e.g., adjust the number of time segments in the TXOP).

As represented by block 826, the reception controller 614 of the transmitting node 600 may determine whether to adjust one or more transmission parameters for subsequent segments based on control information that has been received since the time of the grant at block 812 (e.g., based on the current rate predictions state). Here, the reception controller 614 may elect to adjust one or more transmission parameters if another wireless node has recently scheduled a transmission that will take place at the same time as one or more of the subsequent segments. Such an adjustment may involve, for example, reducing the transmission rate, changing the code rate, adjusting the transmission times, or modifying some other parameter for one or more of the remaining segments.

It should be appreciated that due to the interference avoidance techniques described herein, the received C/I associated with ongoing scheduled transmissions (TXOPs) may not change by a significant amount during the TXOP. For example, a request to transmit at the same time as another scheduled transmission may not be scheduled (e.g., granted) if it is determined that the requested transmission will unduly interfere with a previously scheduled transmission. Consequently, since a node may assume that the conditions of the communication channel may not change by a significant amount during a given TXOP period, a receiving node may aggressively select transmission and coding rates for its scheduled transmission.

As represented by block 830 the control message generator 606 may then generate an acknowledgement 638 that acknowledges receipt of a segment (e.g., segment 424A). Here, a different acknowledgement may be used to provide feedback for each segment of an ongoing transmission. In addition, the acknowledgement 638 may include or be associated with similar information as was transmitted by or in conjunction with the grant 636 at block 812, modified as necessary to include information regarding one or more adjusted transmission parameters from block 826. In other words, the acknowledgement may act as an intermediate "remaining grant" that provides updated resource allocation and rate feedback information and that may be used by neighboring nodes to update their state regarding scheduled receptions in their vicinity. Accordingly, the acknowledgement 638 may comprise one or more of: transmission start time for at least one of the time segments, transmission end time for at least one of the time segments, transmission time period for at least one of the time segments, transmission power for at least one of the time segments, a quantity of redundancy bits to transmit for at least one of the time segments, code rate for at least one of the time segments, expected channel to interference ratio for at least one of the time segments, receive margin, and a pilot signal.

Referring again to FIG. 7, at block 726 the transmission controller 514 adjusts its transmission parameters, as necessary, based on the control information it receives during the inter-segment interval. As mentioned above, this adjustment may be based on information received via an acknowledgement from the associated receiving node or based on information received from other neighboring nodes (e.g., grants or other acknowledgements).

As represented by block 728, in some implementations the control message generator 506 generates another form of confirmation message (e.g., similar to the confirmation message transmitted at block 716) to inform neighboring nodes of the transmission parameters that will be used for the transmission during subsequent time segments (e.g., time segment 424B) or that the transmission is completed. This confirmation message may thus include information that is similar to the information included in the confirmation 538. In this case, however, the confirmation information may include appropriate adjustments based on any changed transmission parameters and including the appropriate timing parameters that relate to the remaining segments to be transmitted. Thus, the confirmation transmitted at block 728 may comprise, for example, transmission start time for at least one of the time segments, transmission end time for at least one of the time segments, transmission time period for at least one of the time segments, transmit power delta, packet format, and a pilot signal.

Referring back to FIG. 8, as represented by block 832, the receiving node continues to monitor the control channel for control information during the inter-segment interval and when the receiving node is monitoring the data channel for the transmitted segments. Accordingly, the receiving node will continue to update its state so that it may continue to adjust the transmission parameters for the current TXOP, as necessary.

As represented by block 730 of FIG. 7 and block 826 of FIG. 8 the above operations are repeated for each subsequently transmitted segment. As represented by block 836 of FIG. 8, after all of the segments have been transmitted (e.g., at the end of the TXOP period) the node comprising the receiving node 600 continues monitoring the control channel to update its transmit constraints state and rate prediction state and to process or initiate requests to transmit, as necessary.

Referring again to FIG. 7, at the end of TXOP period the transmitting node monitors the control channel for a defined period of time so that it may update or reacquire its state records based on received control messages such as grants, confirmations, acknowledgements, and RUMs (block 732). FIGS. 11 and 12 illustrate examples of such state update periods (i.e., post-TXOP monitor periods) that are defined following each scheduled transmission. Here, a state update for node A (STU-A) may immediately follow the termination of the TXOP for node A as represented by the lines 1104 and 1204. Similarly, a state update for node C (STU-C) may immediately follow the termination of the TXOP for node C as represented by the lines 1108 and 1208.

Figure 13A:
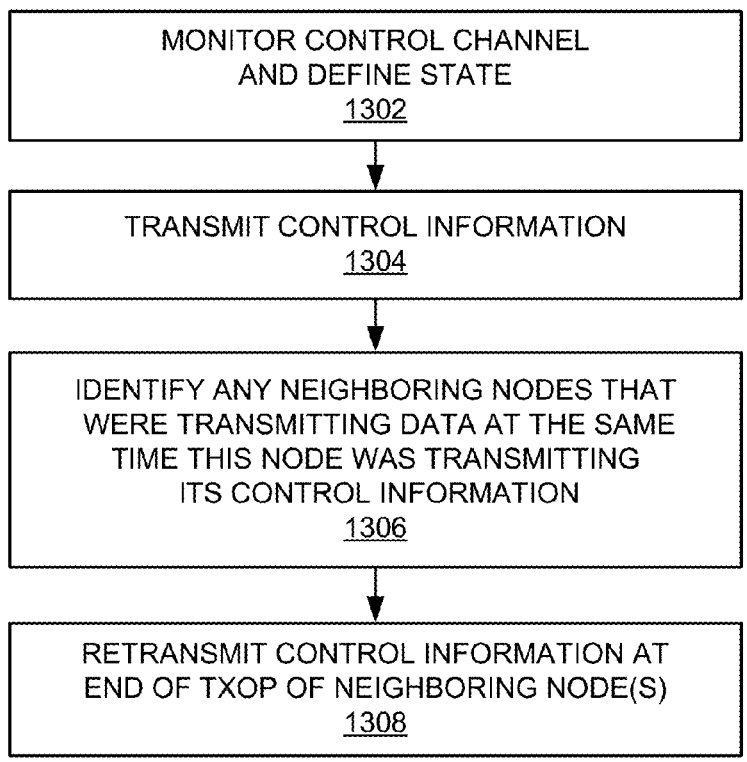
FIGS. 13A and 13B, are flowcharts of several sample aspects of operations that may be performed in conjunction with scheduling transmission of control information.
Figure 13B:
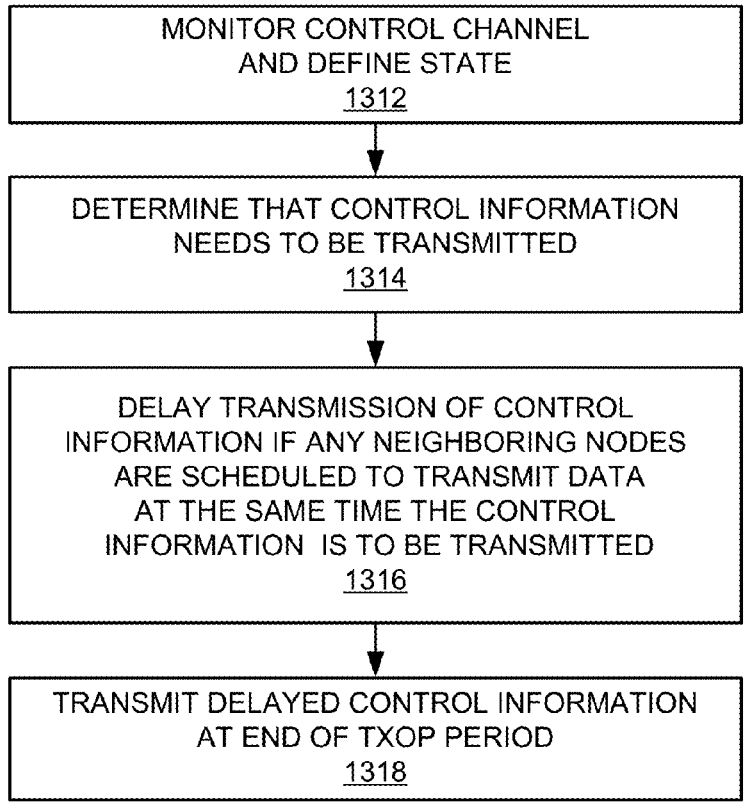

As mentioned above in conjunction with FIG. 4, the control information (e.g., message exchange messages and RUMs) received at this time may include information that is scheduled for transmission either with or without regard to the TXOP period of the transmitting node 500. Two examples of the former case will be discussed in conjunction with FIG. 13. FIG. 13A relates to a scenario where at the end of the TXOP period a node retransmits information that was previously transmitted when a neighboring node was transmitting data. FIG. 13B relates to a scenario where a node may intentionally delay transmitting its control information until the end of the TXOP period of a neighboring node to ensure that the information is received by the neighboring node.

Referring initially to FIG. 13A, as represented by block 1302 a given node maintains its state by monitoring the control channel for information transmitted by other nodes as discussed herein. In this way, the node may acquire information regarding the scheduled TXOP periods of its neighboring transmitting nodes.

As represented by block 1304 at some point in time (e.g., as discussed herein) the node may transmit control information via the control channel. In conjunction with this operation, the node may determine whether any of its neighboring transmitting nodes are transmitting over the data channel at the same time the node transmits its control information over the control channel (block 1306). In this way, the node may determine that one or more neighboring nodes may not have received its control information.

Accordingly, at block 1308 the node may transmit another control message after the end of the TXOP period of each of its neighboring nodes that would not have received the initial control message. Here, the "retransmitted" control message may repeat the information that was previously transmitted in the initial control message. In this way, the node may ensure that its neighboring nodes will take its scheduled transmissions into account when those nodes determine whether to issue a request to transmit or whether to grant a requested transmission.

Referring now to FIG. 13B, as represented by block 1312 a node maintains its state by monitoring the control channel for information transmitted by other nodes. The node may thus acquire information regarding the scheduled TXOP periods of its neighboring transmitting nodes.

As represented by block 1314 at some point in time (e.g., as discussed herein) the node may determine that it needs to transmit control information via the control channel. Before the node transmits the control information, however, the node may determine whether any of its neighboring transmitting nodes are scheduled to transmit over the data channel at the same time that node intends to transmit its control information over the control channel. In this case, the node (e.g., the transmission controller 514 or the reception controller 614) may schedule (e.g., delay) transmission of its control information so that its neighboring nodes may receive the control information to be transmitted (block 1316).

As represented by block 1318, after the end of the TXOP period of each of its neighboring nodes, the node transmits the delayed control information. Again, the node may thereby ensure that its neighboring nodes will take its scheduled transmissions into account when those nodes determine whether to issue a request to transmit or grant a requested transmission.

Referring again to FIG. 7, once the node including the transmitting node 500 receives this control information, it updates or reacquires its state records for use in conjunction with the invocation of future requests to transmit or in conjunction with the granting of request to transmit from other nodes (block 734). As represented by block 736, the node may then continue to monitor the control channel to update its state or service requests to transmit, or it may invoke additional requests to transmit any other backlogged data.

The control message exchange schemes described herein may be implemented in a variety of ways. For example, in some implementations different types of messages may be given higher or a lower priority on the control channel. As an example, acknowledgement messages may be given priority over request messages (using shorter IFS) since the acknowledgement-related exchange occurs in the middle of an ongoing TXOP. This prioritization scheme may avoid unnecessary waste of data bandwidth during the TXOP.

In some implementations a RUM may be an unacknowledged broadcast transmission. In addition, the RUM may be assigned the lowest access priority as compared to a request and an acknowledgement. Moreover, in some implementations an ongoing TXOP may not be terminated by a RUM.

In some implementations, fairness may be implemented over time scales corresponding to a maximum length of a TXOP of some other amount of time. For example, a disadvantaged node may specify that its RUM is valid for a defined period of time (e.g., an amount of time that is sufficient to schedule its own TXOP). In some implementations this defined period of time may be included in the RUM. Conversely, in some implementations a node that receives a RUM may specify that any RUMS it receives will be taken into consideration for a defined period of time. For example, such a node may define a window of time within which it may limit its transmissions or requests for transmissions, if it has received RUMS from a particular node. It should be appreciated that the above defined periods of time may be dynamically changed depending upon current conditions in the system.

In some implementations, if a transmitting node with backlogged data is unable to transmit requests due to the current transmit constraints state, the transmitting node may send an indication of its backlogged status to its associated receiving node (e.g., using a request message with a transmit constrained bit set). In this case, the receiving node may use the RUM mechanism to indicate to neighboring transmitting nodes that they should back off their transmissions.

In some implementations overhead associated with the message exchange scheme may be reduced by eliminating the request and the grant. For example, for transmission of relatively short packets a transmitter may initiate a message exchange by simply transmitting a confirmation on the control channel and then transmitting the data on the data channel, assuming such a transmission is permitted by the current transmit constraints state. Here, the confirmation informs the neighboring nodes of the upcoming transmission. In general, the length of such a data packet may be short. For example, in some embodiments the length of such a data packet is shorter than the length of a given time segment (e.g., time segment 424A). Here, since the C/I at the receiving node may not be known, the transmitting node may select conservative values for one or more of: transmit power, transmission rate, or coding rate.

After transmitting its data, the transmitting node will wait for an acknowledgement from the associated receiving node. In the event an acknowledgement is not received, the transmitting node may back off and retry the transmission using the abbreviated confirmation-acknowledgement exchange. Alternatively, the transmitting node may back off and retry the transmission using the full request-grant-confirmation exchange.

Alternatively, an unsolicited grant scheme may be employed whereby a receiving node transmits a grant any time that the current interference situation at the receiving node indicates that data may be reliably received. In this case, a transmitting node that receives the unsolicited grant may select a transmit power in accordance with any constraints that may be imposed by the current transmit constraints state.

It should be appreciated that the operation and contents of control messages such as those described herein may depend on the type of device that issues the request. For example, an implementation where a pair of associated nodes comprising an access point and access terminal have established a forward link (i.e., data flow from the access point to the access terminal), a request made by the access point may include one or more parameters that may have been described above in conjunction with the grant. For example, this request may comprise information regarding what the access point wants to send and how the access point wants to send it including, for example, a designated TXOP period, an amount of data to be sent, frequency resources to be used such as designated bandwidth, and so on. In this case, in response to the request the access terminal may simply transmit a message (e.g., a "grant") that accepts the request and includes information regarding, for example, a supported transmission rate to the access point, whereupon the access point confirms receipt of this response. In this case, the response generated by the access terminal may not, in a general sense, actually "grant" the request by the access point.

Various provisions also may be taken to address "near-far" problems. As mentioned above, the near far problem may involve interference between nodes (e.g., when a transmitting node is interfering with a receiving node whose associated transmitting node is further away than interfering transmitting node). An example of a solution for near-far problems due to transmissions on the control channel was discussed above in conjunction with FIG. 10.

A reciprocal near-far problem relates to data transmitting nodes that are interfering with another node's reception of control messages. In other words, a node may become deaf to the control channel if there is a strong data transmitting node in the near vicinity. It should be appreciated however, that this problem is similar to the case where the affected node itself is transmitting and, hence, is not receiving control channel messages. Accordingly, the affected node may be able to update its state during the quiet post-TXOP monitor period of the interfering transmitting node.

Similar techniques as described herein may be used to address near-far issues on the data channel. For example, when the data channel utilizes OFDMA there may be other data transmissions that result in leakage interference that affects data reception at a receiving node. The interference management methods described herein relating to the request-grant-confirmation exchange and the acknowledgement-confirmation exchange also may be applied to address this near far-problem for reception of data with overlapping OFDMA transmissions. Similar to interference management thresholds applied to the transmit constraints state and the rate predictions state, these thresholds may be extended for OFDMA inter-hop-port interference. In addition, when a node (e.g., an access point) schedules multiple simultaneous receptions, these receptions may be power controlled by the access point to manage the near-far problem.

Various techniques may be employed for determining whether to issue or grant a request as taught herein. For example, some implementations may utilize one or more thresholds that are compared with one or more of the parameters described above. As a specific example, a determination of whether to schedule a transmission may be based on comparison of a threshold with a value that is based on an estimated channel gain associated with at least one node and an anticipated transmit power for the transmission being scheduled. Finally, it should be noted that certain control information between the transmitter and receiver that is not pertinent to interference management may be sent along with data on the data channel as opposed to the control channel. This ensures that the control channel is used as minimally as possible, since keeping its utilization low is important due to the random access nature. As an example, certain parameters of the confirm message, such as the modulation method used, number of bits of data being sent, remaining data in the buffer, flow identifier (in the event multiple flows from the transmitter are being multiplexed) and in some cases even code rate could be sent along with the data as in-band control.

Figure 14:
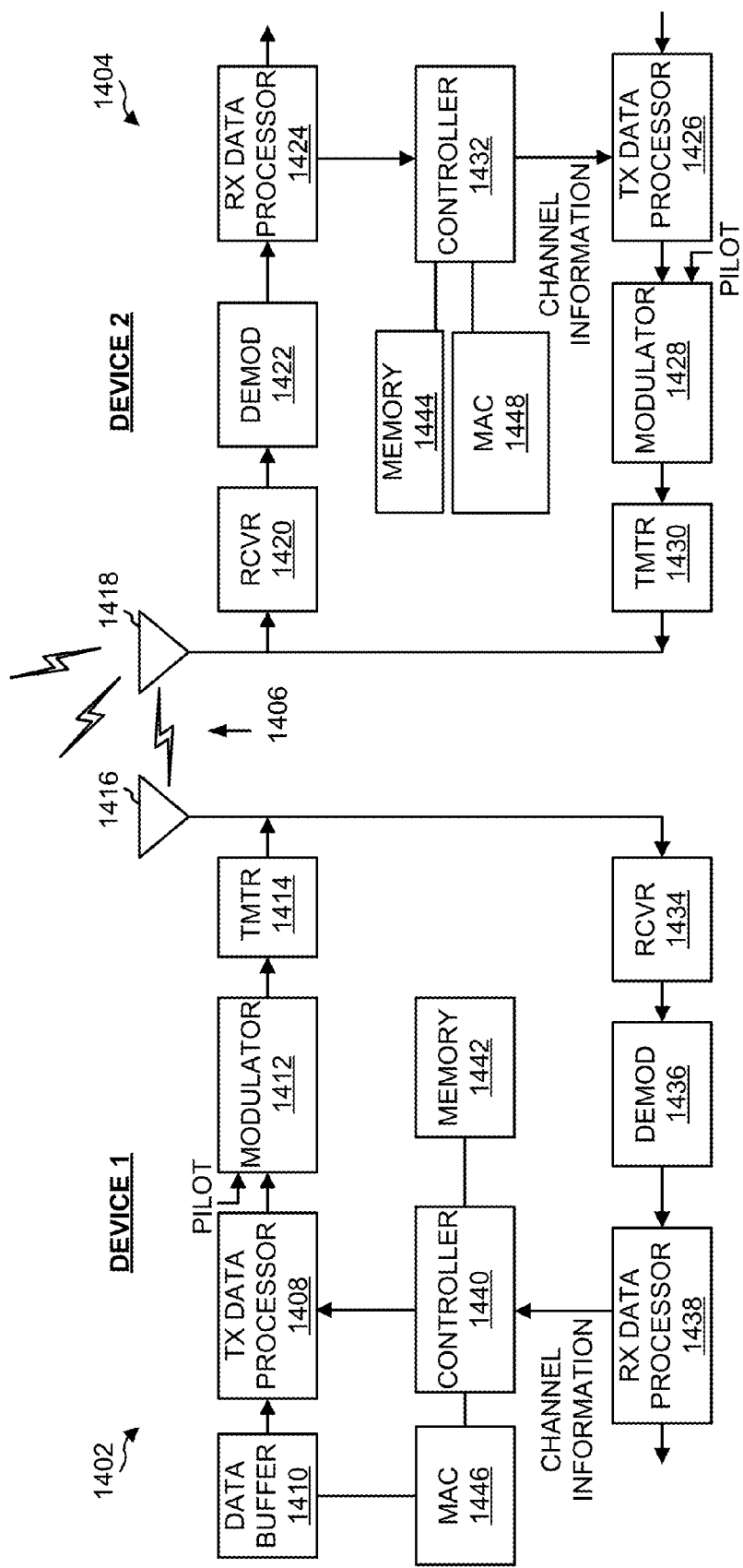
FIG. 14 is a simplified block diagram of several sample aspects of communication components.
Figure 15:
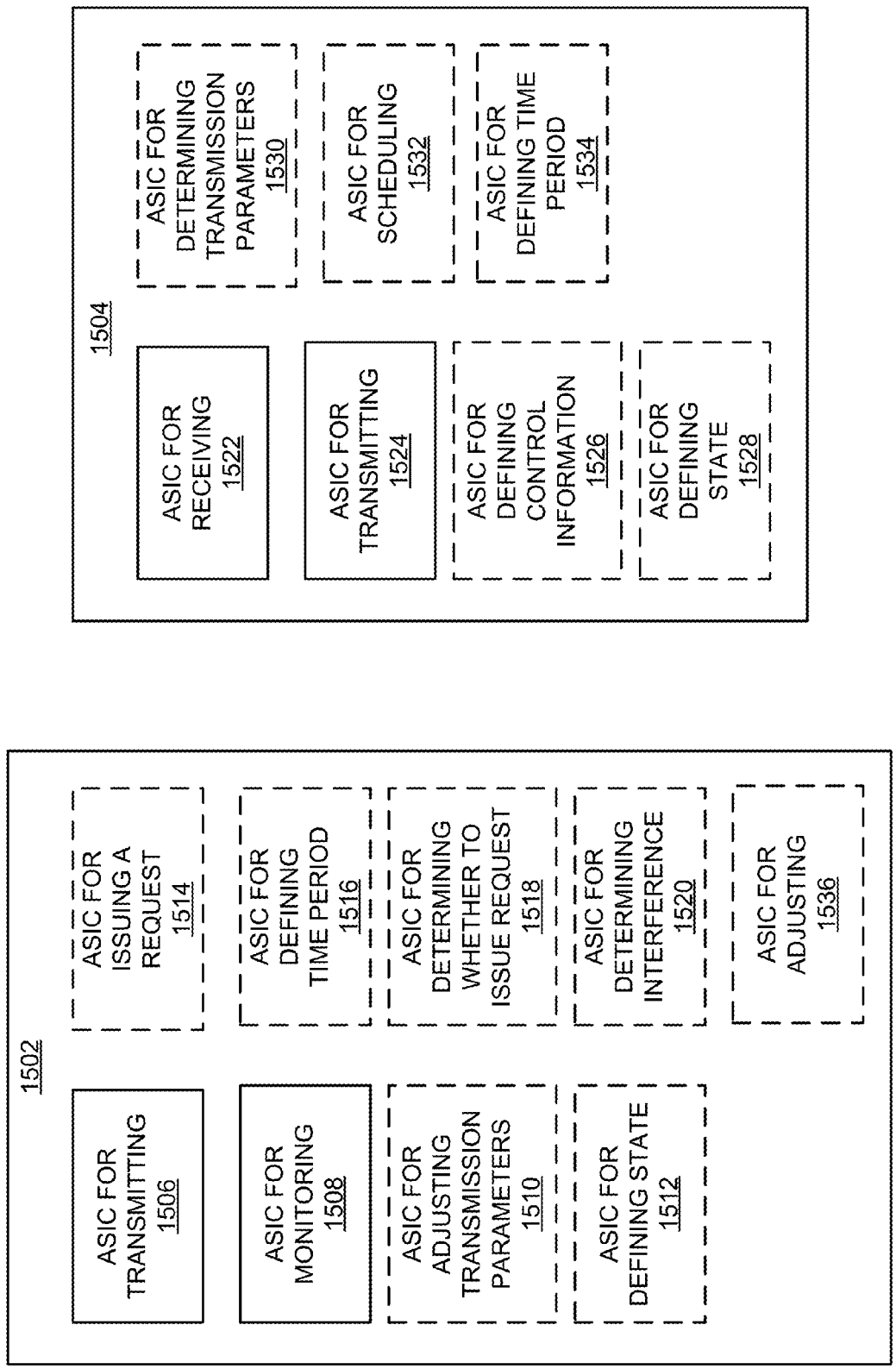
FIGS. 15-19 are several simplified block diagrams of several sample aspects of apparatuses configured to support asynchronous wireless communication.
Figure 16:
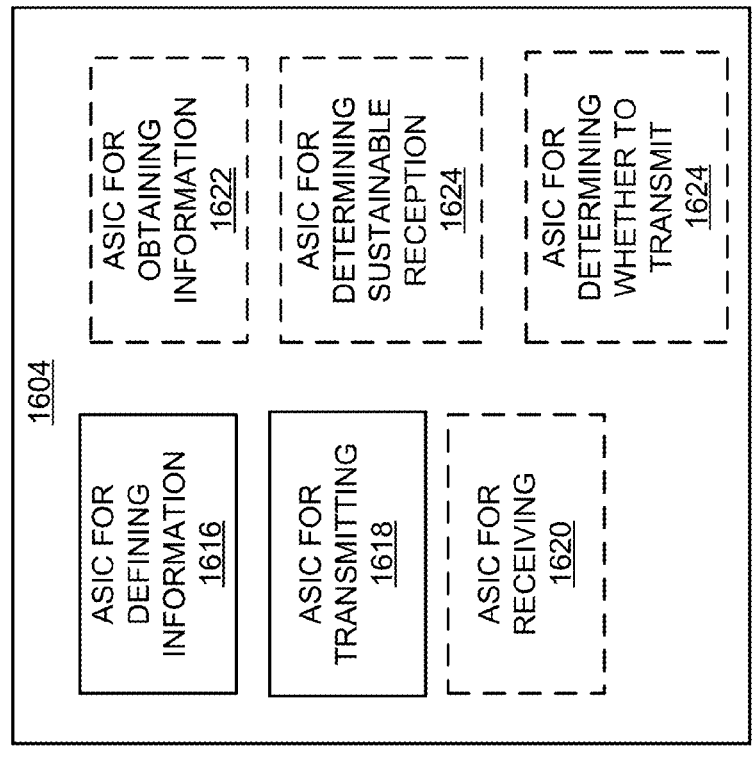
Figure 16:
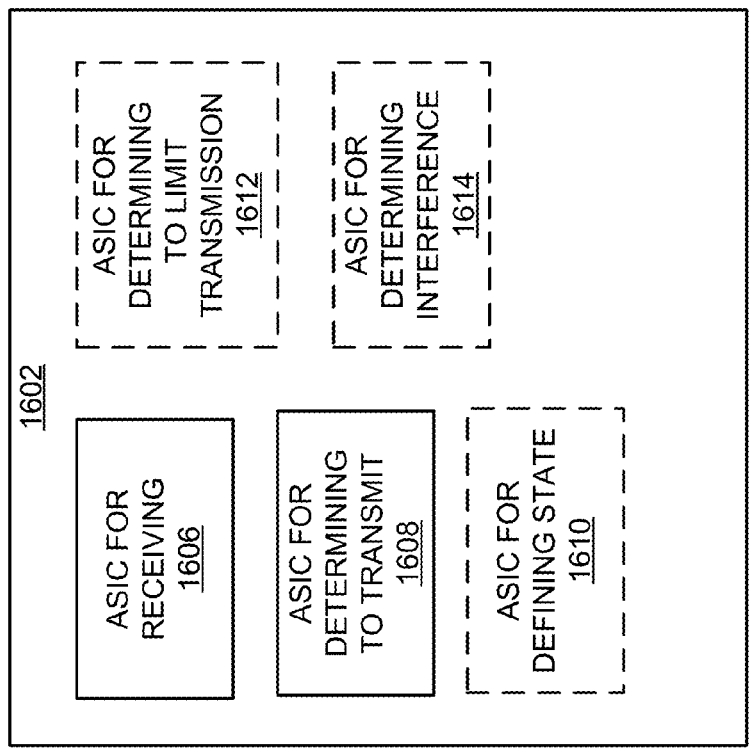
Figure 17:
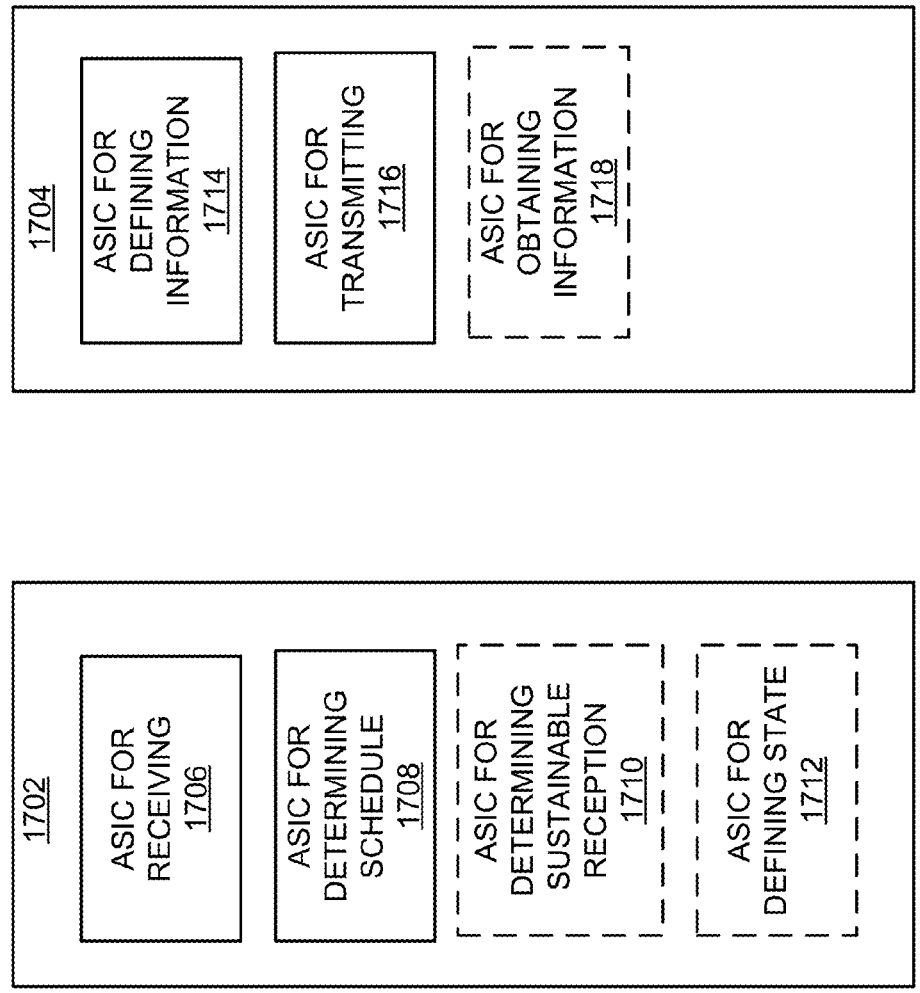
Figure 18:
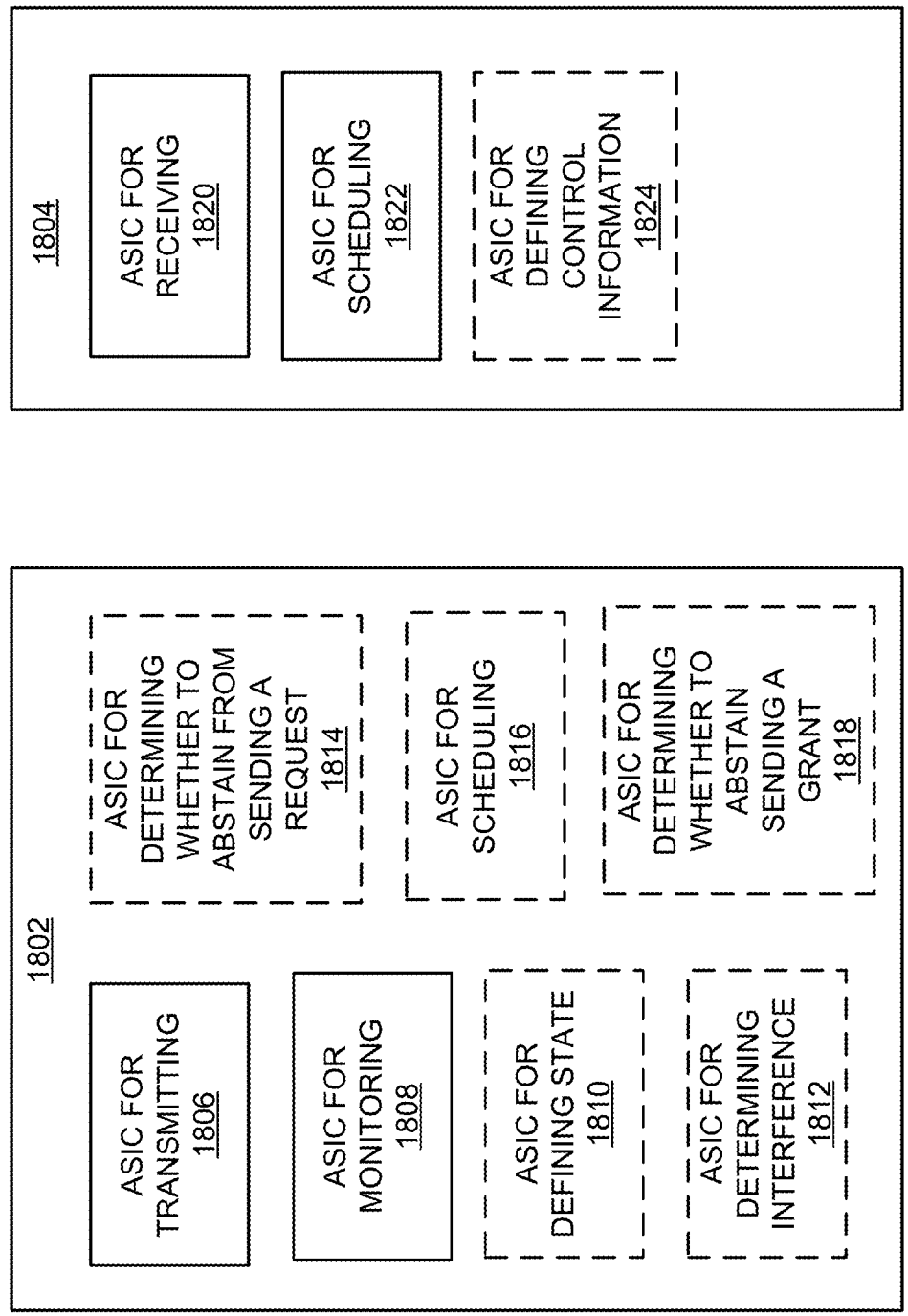
Figure 19:
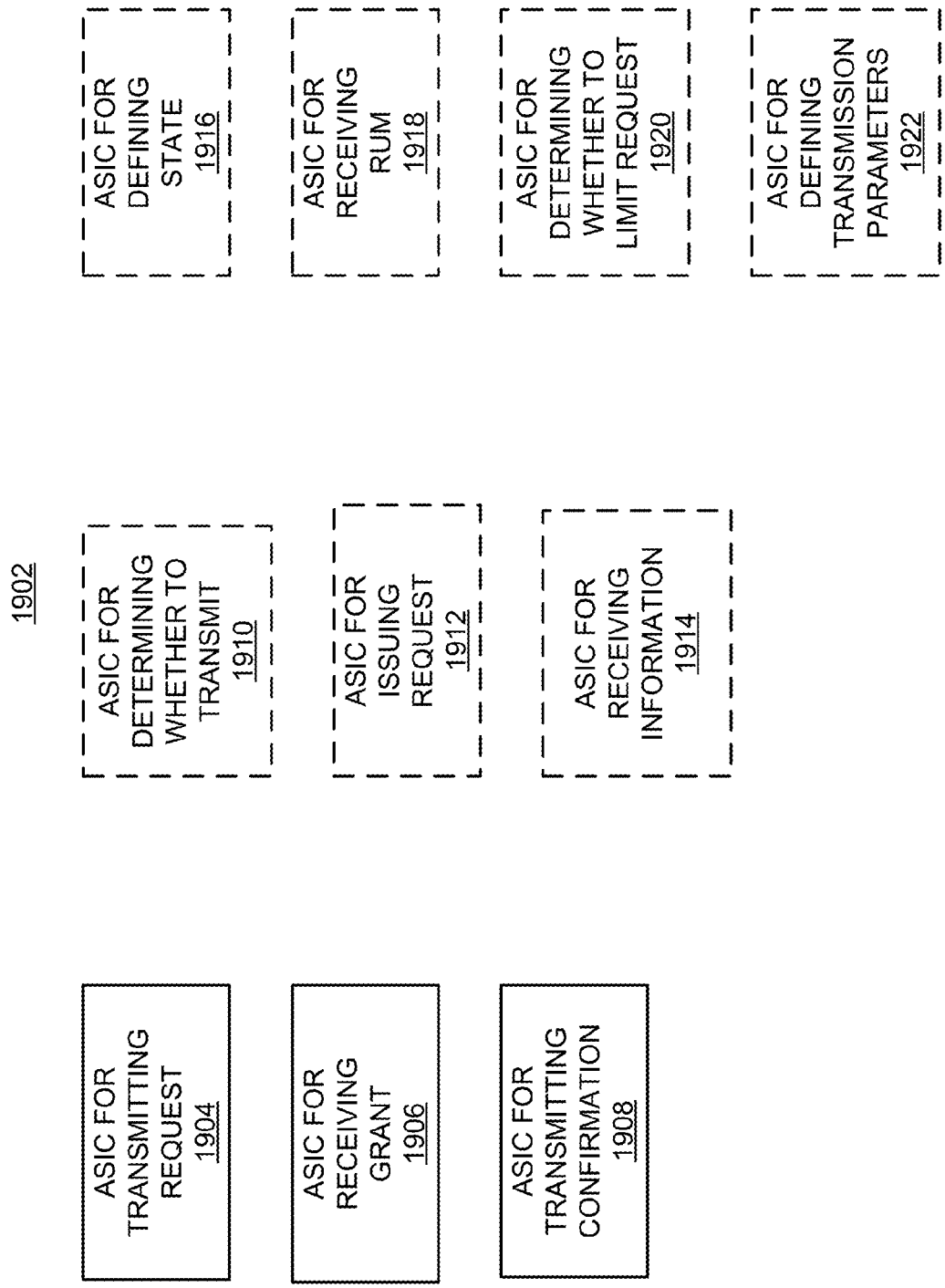

The teachings herein may be incorporated into a device employing various components for communicating with at least one other wireless device. FIG. 14 depicts several sample components that may be employed to facilitate communication between devices. Here, a first device 1402 (e.g., an access terminal) and a second device 1404 (e.g., an access point) are adapted to communicate via a wireless communication link 1406 over a suitable medium.

Initially, components involved in sending information from the device 1402 to the device 1404 (e.g., a reverse link) will be treated. A transmit ("TX") data processor 1408 receives traffic data (e.g., data packets) from a data buffer 1410 or some other suitable component. The transmit data processor 1408 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1412 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 1414 processes (e.g., converts to analog, filters, amplifies, and frequency upconverts) the output chip stream and generates a modulated signal, which is then transmitted from an antenna 1416.

The modulated signals transmitted by the device 1402 (along with signals from other devices in communication with the device 1404) are received by an antenna 1418 of the device 1404. A receiver ("RCVR") 1420 processes (e.g., conditions and digitizes) the received signal from the antenna 1418 and provides received samples. A demodulator ("DEMOD") 1422 processes (e.g., demodulates and detects) the received samples and provides detected data symbols, which may be a noisy estimate of the data symbols transmitted to the device 1404 by the other device(s). A receive ("RX") data processor 1424 processes (e.g., symbol demaps, deinterleaves, and decodes) the detected data symbols and provides decoded data associated with each transmitting device (e.g., device 1402).

Components involved in sending information from the device 1404 to the device 1402 (e.g., a forward link) will be now be treated. At the device 1404, traffic data is processed by a transmit ("TX") data processor 1426 to generate data symbols. A modulator 1428 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 1430 and transmitted from the antenna 1418. In some implementations signaling for the forward link may include power control commands and other information (e.g., relating to a communication channel) generated by a controller 1432 for all devices (e.g. terminals) transmitting on the reverse link to the device 1404.

At the device 1402, the modulated signal transmitted by the device 1404 is received by the antenna 1416, conditioned and digitized by a receiver ("RCVR") 1434, and processed by a demodulator ("DEMOD") 1436 to obtain detected data symbols. A receive ("RX") data processor 1438 processes the detected data symbols and provides decoded data for the device 1402 and the forward link signaling. A controller 1440 receives power control commands and other information to control data transmission and to control transmit power on the reverse link to the device 1404.

The controllers 1440 and 1432 direct various operations of the device 1402 and the device 1404, respectively. For example, a controller may determine an appropriate filter, reporting information about the filter, and decode information using a filter. Data memories 1442 and 1444 may store program codes and data used by the controllers 1440 and 1432, respectively.

FIG. 14 also illustrates that the communication components may include one or more components that perform one or more of the operations as taught herein. For example, a media access control ("MAC") component 1446 may cooperate with the controller 1440 and/or other components of the device 1402 to send data and control information to and receive data and control information from another device (e.g., device 1404) in accordance with the asynchronous techniques as taught herein. Similarly, a MAC component 1448 may cooperate with the controller 1432 and/or other components of the device 1404 to send data and control information to and receive data and control information from another device (e.g., device 1402) in accordance with the described asynchronous techniques.

The teachings herein may be incorporated into (e.g., implemented within or performed by) a variety of apparatuses (e.g., devices). For example, each node may be configured, or referred to, as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Certain nodes also may be referred to as subscriber stations. A subscriber station also may be known as a subscriber unit, a mobile station, a remote station, a remote terminal, an access terminal, a user terminal, a user agent, a user device, or user equipment. In some implementations a subscriber station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access device (e.g., a cellular or Wi-Fi access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi station) to access the network or some other functionality.

A wireless node may thus include various components that perform functions based on data transmitted or received by the wireless node. For example, an access point and an access terminal may include an antenna for transmitting and receiving signals (e.g., control and data). An access point also may include a traffic manager configured to manage data traffic flows that its receiver receives from a plurality of wireless nodes or that its transmitter transmits to a plurality of wireless nodes. In addition, an access terminal may include a user interface configured to output an indication based on data received by the receiver (e.g., based on a scheduled reception of data) or provide data to be transmitted by the transmitter.

A wireless device may communicate via one or more wireless communication links that are based on or otherwise support any suitable wireless communication technology. For example, in some aspects a wireless device may associate with a network or two or more wireless devices may form a network. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a wireless device may comprise a wireless transceiver with associated transmitter and receiver components (e.g., transmitters 520 and 620 and receivers 518 and 618) that may include various components (e.g., signal generators and signal processors) that facilitate communication over a wireless medium.

The components described herein may be implemented in a variety of ways. Referring to FIGS. 15-19, several apparatuses 1502, 1504, 1602, 1604, 1702, 1704, 1802, 1804, and 1902 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatuses 1502, 1504, 1602, 1604, 1702, 1704, 1802, 1804, and 1902 may include one or more modules that may perform one or more of the functions described above with regard to various figures. For example, an ASIC for transmitting 1506, 1524, 1618, 1716, 1806, 1904, or 1908 may correspond to, for example, a transmitter as discussed herein. An ASIC for receiving 1522, 1606, 1620, 1706, 1820, 1906, 1914, or 1918, for monitoring 1508 or 1808, or for obtaining information 1622 or 1718 may correspond to, for example, a receiver as discussed herein. An ASIC for defining state 1512, 1528, 1610, 1712, 1810, or 1916 may correspond to, for example, a state controller as discussed herein. An ASIC for adjusting transmission parameters 1510, for determining transmission parameters 1530 or 1922, for defining control information 1526 or 1824, for defining information 1616 or 1714 may correspond to, for example, a transmission parameter definer as discussed herein. An ASIC for defining a time period 1516 or 1534 may correspond to, for example, a transmission parameter definer as discussed herein. An ASIC for issuing a request 1514 or 1912, for determining whether to issue a request 1518, for adjusting 1536, for determining whether to limit transmission 1612, for determining whether to abstain from sending a request 1814, for determining whether to transmit 1608, 1624, or 1910, or for determining whether to limit a request 1920 may correspond to, for example, a transmission controller as discussed herein. An ASIC for determining interference 1520, 1614, or 1812 may correspond to, for example, an interference determiner as discussed herein. An ASIC for scheduling 1532, 1816, or 1822, or for determining a schedule 1708 may correspond to, for example, a transmission controller or a reception controller as discussed herein. An ASIC for determining sustainable reception 1624 or 1710, or for determining whether to abstain from sending a grant 1818 may correspond to, for example, a reception controller as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 1502, 1504, 1602, 1604, 1702, 1704, 1802, 1804, and 1902 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 15-19, as well as other components and functions described herein, may be implemented using any suitable means. Such means also may be implemented, at least in part, using corresponding structure as taught herein. For example, the components described above in conjunction with the "ASIC for" components of FIGS. 15-19 also may correspond to similarly designated "means for" functionality. Thus, in some aspects one or more of such means may be implemented using one or more processor components, integrated circuits, or other suitable structure as taught herein.

Also, it should be understood that any reference to an element herein using a designation such as "first," "second," and so forth does not generally limit the quantity or order of those elements. Rather, these designations are used herein as a convenient method of distinguishing between two or more different nodes. Thus, a reference to first and second nodes does not mean that only two nodes may be employed there or that the first node must precede the second node in some manner.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication for a first wireless node, comprising:
    receiving information at the first wireless node that indicates a scheduled reception of data for a second wireless node;
    determining an extent to which a transmission from the first wireless node to a third wireless node during a time period associated with the scheduled reception of data would interfere with reception at the second wireless node, wherein the determination of the extent is based on the received information; and
    determining at least one transmit parameter for the transmission from the first wireless node to the third wireless node, wherein the determination of the at least one transmit parameter is based on the determined extent.

2. The method of claim 1, wherein:
    the reception of the information comprises receiving a signal from the second wireless node;
    the method further comprises determining a path loss between the first wireless node and the second wireless node based on the received signal; and
    the determination of the extent is further based on the path loss.

3. The method of claim 1, wherein:
    the reception of the information comprises receiving a signal from the second wireless node;
    the method further comprises determining a signal strength of the received signal; and
    the determination of the extent is further based on the signal strength.

4. The method of claim 1, wherein the determination of the at least one transmit parameter comprises modifying a set of rules relating to a degree to which transmission by the first wireless node may interfere with reception at the second wireless node.

5. The method of claim 1, wherein the determination of the at least one transmit parameter comprises adjusting a transmit bandwidth based on the determined extent.

6. The method of claim 1, wherein the determination of the at least one transmit parameter comprises adjusting a transmit rate based on the determined extent.

7. The method of claim 1, wherein the determination of the at least one transmit parameter comprises adjusting a transmit power delta based on the determined extent.

8. The method of claim 1, wherein the determination of the at least one transmit parameter comprises adjusting a transmit power level based on the determined extent.

9. The method of claim 1, wherein the determination of the at least one transmit parameter comprises adjusting a transmission time based on the determined extent.

10. The method of claim 1, wherein the determination of the at least one transmit parameter comprises determining an extent to which the at least one transmit parameter is adapted.

11. The method of claim 1, further comprising:
    receiving other information that indicates at least one other scheduled reception of data; and
    aggregating the received information and the received other information over a period of time,
    wherein the determination of the extent is further based on the aggregated information.

12. The method of claim 1, wherein the determination of the extent is based on a receive margin associated with the received information.

13. The method of claim 1, wherein the determination of the extent is based on a pilot signal associated with the received information.

14. The method of claim 1, wherein the received information comprises at least one of: a transmission start time, a transmission end time, a transmission time period, a transmission power, a quantity of redundancy bits to transmit, a code rate, or an expected channel to interference ratio.

15. The method of claim 1, wherein the transmission from the first wireless node to the third wireless node comprises a transmission via a control channel.

16. The method of claim 15, wherein:
the first wireless node transmits data via a data channel;
the control channel and the data channel are frequency division multiplexed within a common frequency band; and
the control channel is associated with a plurality of sub-frequency bands that are interspersed within the common frequency band.

17. The method of claim 1, wherein the received information comprises a grant message generated by the second wireless node in response to a request to transmit by a fourth wireless node.

18. The method of claim 1, wherein:
the second wireless node receives data transmitted by a fourth wireless node during a plurality of time segments defined within a scheduled transmit time period corresponding to the scheduled reception of data; and
a time interval for transmission or reception of control information is temporally located between the time segments.

19. The method of claim 1, wherein the received information comprises a resource utilization message that indicates at least one of: a level of desired interference reduction, a resource to be cleared, or a degree to which reception at a receiving wireless node is not meeting a desired level of quality of service.

20. The method of claim 1, further comprising:
transmitting data from the first wireless node via an antenna to the third wireless node according to the at least one transmit parameter.

21. An apparatus for wireless communication for a first wireless node, comprising:
a receiver configured to receive information that indicates a scheduled reception of data for a second wireless node; and
a controller coupled with the receiver and configured to:
determine an extent to which a transmission from the first wireless node to a third wireless node during a time period associated with the scheduled reception of data would interfere with reception at the second wireless node, wherein the determination of the extent is based on the received information, and
determine at least one transmit parameter for the transmission from the first wireless node to the third wireless node, wherein the determination of the at least one transmit parameter is based on the determined extent.

22. The apparatus of claim 21, wherein:
the receiver is configured to receive the information by being configured to receive a signal from the second wireless node;
the controller is further configured to determine a path loss between the first wireless node and the second wireless node based on the received signal; and
the controller is configured to determine the extent based on the path loss.

23. The apparatus of claim 21, wherein:
the receiver is configured to receive the information by being configured to receive a signal from the second wireless node;
the controller is further configured to determine a signal strength of the received signal; and
the controller is configured to determine the extent based on the signal strength.

24. The apparatus of claim 21, wherein, to determine the at least one transmit parameter, the controller is further configured to modify a set of rules relating to a degree to which transmission by the first wireless node may interfere with reception at the second wireless node.

25. The apparatus of claim 21, wherein, to determine the at least one transmit parameter, the controller is further configured to adjust at least one of: a transmit bandwidth, a code rate, or a transmit power delta.

26. The apparatus of claim 21, wherein, to determine the at least one transmit parameter, the controller is further configured to determine an extent to which the at least one transmit parameter is adapted.

27. The apparatus of claim 21, wherein the controller is configured to determine the extent based on a receive margin associated with the received information or based on a pilot signal associated with the received information.

28. The apparatus of claim 21, further comprising:
a transmitter coupled with the controller and configured to transmit data from the first wireless node via an antenna to the third wireless node, wherein the transmitter is further configured to transmit the data according to the at least one transmit parameter.

29. An apparatus for wireless communication for a first wireless node, comprising:
means for receiving information that indicates a scheduled reception of data for a second wireless node;
means for determining an extent to which a transmission from the first wireless node to a third wireless node during a time period associated with the scheduled reception of data would interfere with reception at the second wireless node, wherein the determination of the extent is based on the received information; and
means for determining at least one transmit parameter for the transmission from the first wireless node to the third wireless node, wherein the determination of the at least one transmit parameter is based on the determined extent.

30. A non-transitory computer-readable medium storing computer executable code for wireless communication for a first wireless node, including code to:
receive information that indicates a scheduled reception of data for a second wireless node;
determine an extent to which a transmission from the first wireless node to a third wireless node during a time period associated with the scheduled reception of data would interfere with reception at the second wireless node, wherein the determination of the extent is based on the received information; and
determine at least one transmit parameter for the transmission from the first wireless node to the third wireless node, wherein the determination of the at least one transmit parameter is based on the determined extent.

\* \* \* \* \*